US012808627B2

(12) United States Patent
Gish et al.

(10) Patent No.: US 12,808,627 B2
(45) Date of Patent: Nov. 24, 2026

(54) HOLSTER SENSING BY A CONDUCTED ELECTRICAL WEAPON

(71) Applicant: Axon Enterprise, Inc., Scottsdale, AZ (US)

(72) Inventors: Michael E. Gish, Scottsdale, AZ (US); Magne H. Nerheim, Paradise Valley, AZ (US); Lynn Kern, Phoenix, AZ (US); Mark J. Eastwood, Scottsdale, AZ (US)

(73) Assignee: AXON ENTERPRISE, INC., Scottsdale, AZ (US)

( * ) Notice: Subject to any disclaimer, the term of this patent is extended or adjusted under 35 U.S.C. 154(b) by 151 days.

(21) Appl. No.: 18/692,703

(22) PCT Filed: Sep. 15, 2022

(86) PCT No.: PCT/US2022/043725
§ 371 (c)(1),
(2) Date: Mar. 15, 2024

(87) PCT Pub. No.: WO2023/043965
PCT Pub. Date: Mar. 23, 2023

(65) Prior Publication Data

US 2024/0377159 A1 Nov. 14, 2024

Related U.S. Application Data

(60) Provisional application No. 63/244,659, filed on Sep. 15, 2021.

(51) Int. Cl.
*F41C 33/02* (2006.01)
*F41H 13/00* (2006.01)
*G08B 21/24* (2006.01)

(52) U.S. Cl.
CPC ..... *F41C 33/0209* (2013.01); *F41H 13/0025* (2013.01); *G08B 21/24* (2013.01)

(58) Field of Classification Search
None
See application file for complete search history.

(56) References Cited

U.S. PATENT DOCUMENTS

2006/0208857 A1 9/2006 Wong
2015/0184978 A1 7/2015 Hedeen
(Continued)

FOREIGN PATENT DOCUMENTS

CN 207675038 U 7/2018
CN 108871056 A 11/2018
(Continued)

OTHER PUBLICATIONS

European Patent Office, Extended European Search Report for European Application No. 22870720.4, mailed Jul. 8, 2025.
(Continued)

*Primary Examiner* — Reginald S Tillman, Jr.
(74) *Attorney, Agent, or Firm* — H S. Malvich, Jr.; Andrew Graham

(57) ABSTRACT

Holsters of conducted electrical weapons (CEW) comprise a set of magnetic elements. The set of magnetic elements may have positions, polarities, and magnitudes corresponding to types of holsters. The CEW uses sensors to detect one or more of the set of magnetic elements, indicating that the CEW is inserted into the holster. Based on the detected information, the CEW identifies when the CEW is removed from the holster. The CEW additionally uses the detected information to determine a type of holster.

20 Claims, 9 Drawing Sheets

(56) References Cited

U.S. PATENT DOCUMENTS

| | | | | |
|---|---|---|---|---|
| 2016/0241807 | A1 | 8/2016 | Kovac | |
| 2016/0377373 | A1* | 12/2016 | Feldstein | F41C 33/029<br>42/1.01 |
| 2017/0016696 | A1 | 1/2017 | Koskan et al. | |
| 2017/0061781 | A1 | 3/2017 | Ware et al. | |

FOREIGN PATENT DOCUMENTS

| | | | |
|---|---|---|---|
| CN | 110542929 | A | 12/2019 |
| CN | 111947513 | A | 11/2020 |

OTHER PUBLICATIONS

Taiwan Patent Office, Allowance Decision of Examination for Taiwan Application No. 111134946 mailed Jun. 7, 2024.
The International Bureau of WIPO, Preliminary Report for International Application No. PCT/US22/43725 mailed Mar. 28, 2024.
Korean Intellectual Property Office, International Search Report for International Application No. PCT/US2022/043725 mailed Jan. 27, 2023.
Taiwan Intellectual Property Office, Preliminary Examination for Taiwan Application No. 111134946 mailed Sep. 25, 2023.

* cited by examiner

HOLSTER SENSING BY A CONDUCTED ELECTRICAL WEAPON

CROSS-REFERENCE TO RELATED APPLICATIONS

This application claims priority to International PCT Application PCT/US22/43725, filed Sep. 15, 2022, which claims the benefit of U.S. Provisional Application 63/244,659, filed Sep. 15, 2021, which is incorporated by reference herein in its entirety.

FIELD OF THE INVENTION

Embodiments of the present invention relate to a conducted electrical weapon ("CEW").

BRIEF DESCRIPTION OF THE SEVERAL VIEWS OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Figure 1:
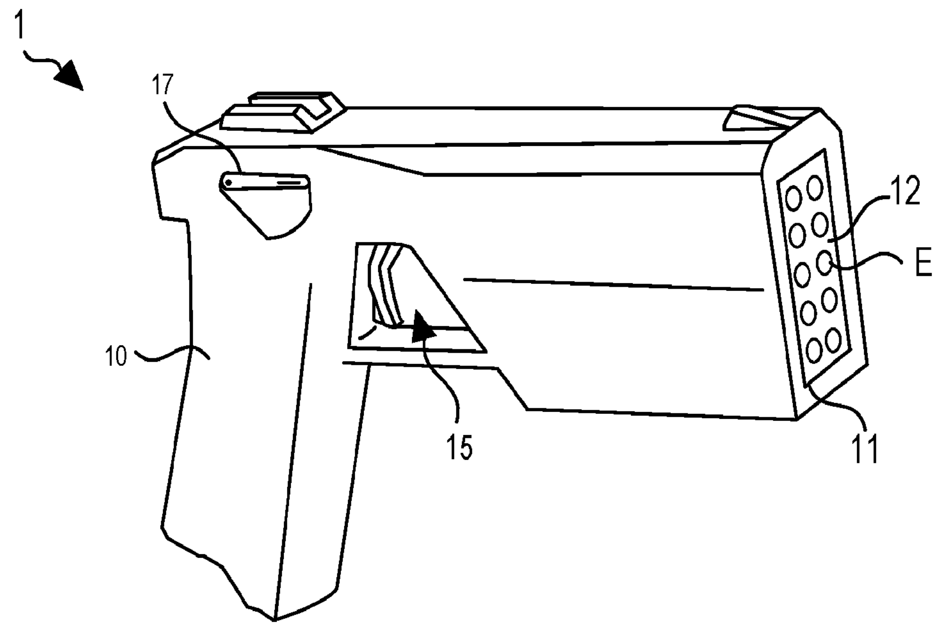
FIG. 1 is a perspective view of a conducted electrical weapon ("CEW"), in accordance with various embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Systems, methods, and apparatuses may be used to interfere with voluntary locomotion (e.g., walking, running, moving, etc.) of a target. For example, a CEW may be used to deliver a current (e.g., stimulus signal, pulses of current, pulses of charge, etc.) through tissue of a human or animal target. Although typically referred to as a conducted electrical weapon, as described herein a "CEW" may refer to a conducted electrical weapon, a conducted energy weapon, an electronic control device, and/or any other similar device or apparatus configured to provide a stimulus signal through one or more deployed projectiles (e.g., electrodes).

A stimulus signal carries a charge into target tissue. The stimulus signal may interfere with voluntary locomotion of the target. The stimulus signal may cause pain. The pain may also function to encourage the target to stop moving. The stimulus signal may cause skeletal muscles of the target to become stiff (e.g., lock up, freeze, etc.). The stiffening of the muscles in response to a stimulus signal may be referred to as neuromuscular incapacitation ("NMI"). NMI disrupts voluntary control of the muscles of the target. The inability of the target to control its muscles interferes with locomotion of the target.

A stimulus signal may be delivered through the target via terminals coupled to the CEW. Delivery via terminals may be referred to as a local delivery (e.g., a local stun, a drive stun, etc.). During local delivery, the terminals are brought close to the target by positioning the CEW proximate to the target. The stimulus signal is delivered through the target's tissue via the terminals. To provide local delivery, the user of the CEW is generally within arm's reach of the target and brings the terminals of the CEW into contact with or proximate to the target.

A stimulus signal may be delivered through the target via one or more (typically at least two) wire-tethered electrodes. Delivery via wire-tethered electrodes may be referred to as a remote delivery (e.g., a remote stun). During a remote delivery, the CEW may be separated from the target up to the length (e.g., 15 feet, 20 feet, 30 feet, etc.) of the wire tether. The CEW launches the electrodes towards the target. As the electrodes travel toward the target, the respective wire tethers deploy behind the electrodes. The wire tether electrically couples the CEW to the electrode. The electrode may electrically couple to the target thereby coupling the CEW to the target. In response to the electrodes connecting with, impacting on, or being positioned proximate to the target's tissue, the current may be provided through the target via the electrodes (e.g., a circuit is formed through the first tether and the first electrode, the target's tissue, and the second electrode and the second tether).

Terminals or electrodes that contact or are proximate to the target's tissue deliver the stimulus signal through the target. Contact of a terminal or electrode with the target's tissue establishes an electrical coupling (e.g., circuit) with the target's tissue. Electrodes may include a spear that may pierce the target's tissue to contact the target. A terminal or electrode that is proximate to the target's tissue may use ionization to establish an electrical coupling with the target's tissue. Ionization may also be referred to as arcing.

In use (e.g., during deployment), a terminal or electrode may be separated from the target's tissue by the target's clothing or a gap of air. In various embodiments, a signal generator of the CEW may provide the stimulus signal (e.g., current, pulses of current, etc.) at a high voltage (e.g., in the range of 40,000 to 100,000 volts) to ionize the air in the clothing or the air in the gap that separates the terminal or electrode from the target's tissue. Ionizing the air establishes a low impedance ionization path from the terminal or electrode to the target's tissue that may be used to deliver the stimulus signal into the target's tissue via the ionization path. The ionization path persists (e.g., remains in existence, lasts, etc.) as long as the current of a pulse of the stimulus signal is provided via the ionization path. When the current ceases or is reduced below a threshold (e.g., amperage, voltage), the ionization path collapses (e.g., ceases to exist) and the terminal or electrode is no longer electrically coupled to the target's tissue. Lacking the ionization path, the impedance between the terminal or electrode and target tissue is high. A high voltage in the range of about 50,000 volts can ionize air in a gap of up to about one inch.

A CEW may provide a stimulus signal as a series of current pulses. Each current pulse may include a high voltage portion (e.g., 40,000-100,000 volts) and a low voltage portion (e.g., 500-6,000 volts). The high voltage portion of a pulse of a stimulus signal may ionize air in a gap between an electrode or terminal and a target to electrically couple the electrode or terminal to the target. In response to the electrode or terminal being electrically coupled to the target, the low voltage portion of the pulse delivers an amount of charge into the target's tissue via the ionization path. In response to the electrode or terminal being electrically coupled to the target by contact (e.g., touching, spear embedded into tissue, etc.), the high portion of the pulse and the low portion of the pulse both deliver charge to the target's tissue. Generally, the low voltage portion of the pulse delivers a majority of the charge of the pulse into the target's tissue. In various embodiments, the high voltage portion of a pulse of the stimulus signal may be referred to as the spark or ionization portion. The low voltage portion of a pulse may be referred to as the muscle portion.

In various embodiments, a signal generator of the CEW may provide the stimulus signal (e.g., current, pulses of current, etc.) at only a low voltage (e.g., less than 2,000 volts). The low voltage stimulus signal may not ionize the air in the clothing or the air in the gap that separates the terminal or electrode from the target's tissue. A CEW having a signal generator providing stimulus signals at only a low voltage (e.g., a low voltage signal generator) may require deployed electrodes to be electrically coupled to the target by contact (e.g., touching, spear embedded into tissue, etc.).

A CEW may include at least two terminals at the face of the CEW. A CEW may include two terminals for each bay that accepts a magazine (e.g., deployment unit). The terminals are spaced apart from each other. In response to the electrodes of the magazine in the bay having not been deployed, the high voltage impressed across the terminals will result in ionization of the air between the terminals. The arc between the terminals may be visible to the naked eye. In response to a launched electrode not electrically coupling to a target, the current that would have been provided via the electrodes may arc across the face of the CEW via the terminals.

The likelihood that the stimulus signal will cause NMI increases when the electrodes that deliver the stimulus signal are spaced apart at least 6 inches (15.24 centimeters) so that the current from the stimulus signal flows through the at least 6 inches of the target's tissue. In various embodiments, the electrodes preferably should be spaced apart at least 12 inches (30.48 centimeters) on the target. Because the terminals on a CEW are typically less than 6 inches apart, a stimulus signal delivered through the target's tissue via terminals likely will not cause NMI, only pain.

A series of pulses may include two or more pulses separated in time. Each pulse delivers an amount of charge into the target's tissue. In response to the electrodes being appropriately spaced (as discussed above), the likelihood of inducing NMI increases as each pulse delivers an amount of charge in the range of 55 microcoulombs to 71 microcoulombs per pulse. The likelihood of inducing NMI increases when the rate of pulse delivery (e.g., rate, pulse rate, repetition rate, etc.) is between 11 pulses per second ("pps") and 50 pps. Pulses delivered at a higher rate may provide less charge per pulse to induce NMI. Pulses that deliver more charge per pulse may be delivered at a lesser rate to induce NMI. In various embodiments, a CEW may be hand-held and use batteries to provide the pulses of the stimulus signal. In response to the amount of charge per pulse being high and the pulse rate being high, the CEW may use more energy than is needed to induce NMI. Using more energy than is needed depletes batteries more quickly.

Empirical testing has shown that the power of the battery may be conserved with a high likelihood of causing NMI in response to the pulse rate being less than 44 pps and the charge per a pulse being about 63 microcoulombs. Empirical testing has shown that a pulse rate of 22 pps and 63 microcoulombs per a pulse via a pair of electrodes will induce NMI when the electrode spacing is at least 12 inches (30.48 centimeters).

In various embodiments, a CEW may include a handle and one or more magazines (e.g., deployment units, etc.). The handle may include one or more bays for receiving the magazine(s). Each magazine may be removably positioned in (e.g., inserted into, coupled to, etc.) a bay. Each magazine may releasably electrically, electronically, and/or mechanically couple to a bay. A deployment of the CEW may launch one or more electrodes from the magazine and toward a target to remotely deliver the stimulus signal through the target.

In various embodiments, a magazine may include two or more electrodes (e.g., projectiles, cartridges, etc.) that are launched at the same time. In various embodiments, a magazine may include two or more electrodes that may each be launched individually at separate times. In various embodiments, a magazine may include a single electrode configured to be launched from the magazine. Launching the electrodes may be referred to as activating (e.g., firing) a magazine or electrode. After use (e.g., activation, firing), a magazine may be removed from the bay and replaced with an unused (e.g., not fired, not activated) magazine to permit launch of additional electrodes.

Figure 2:
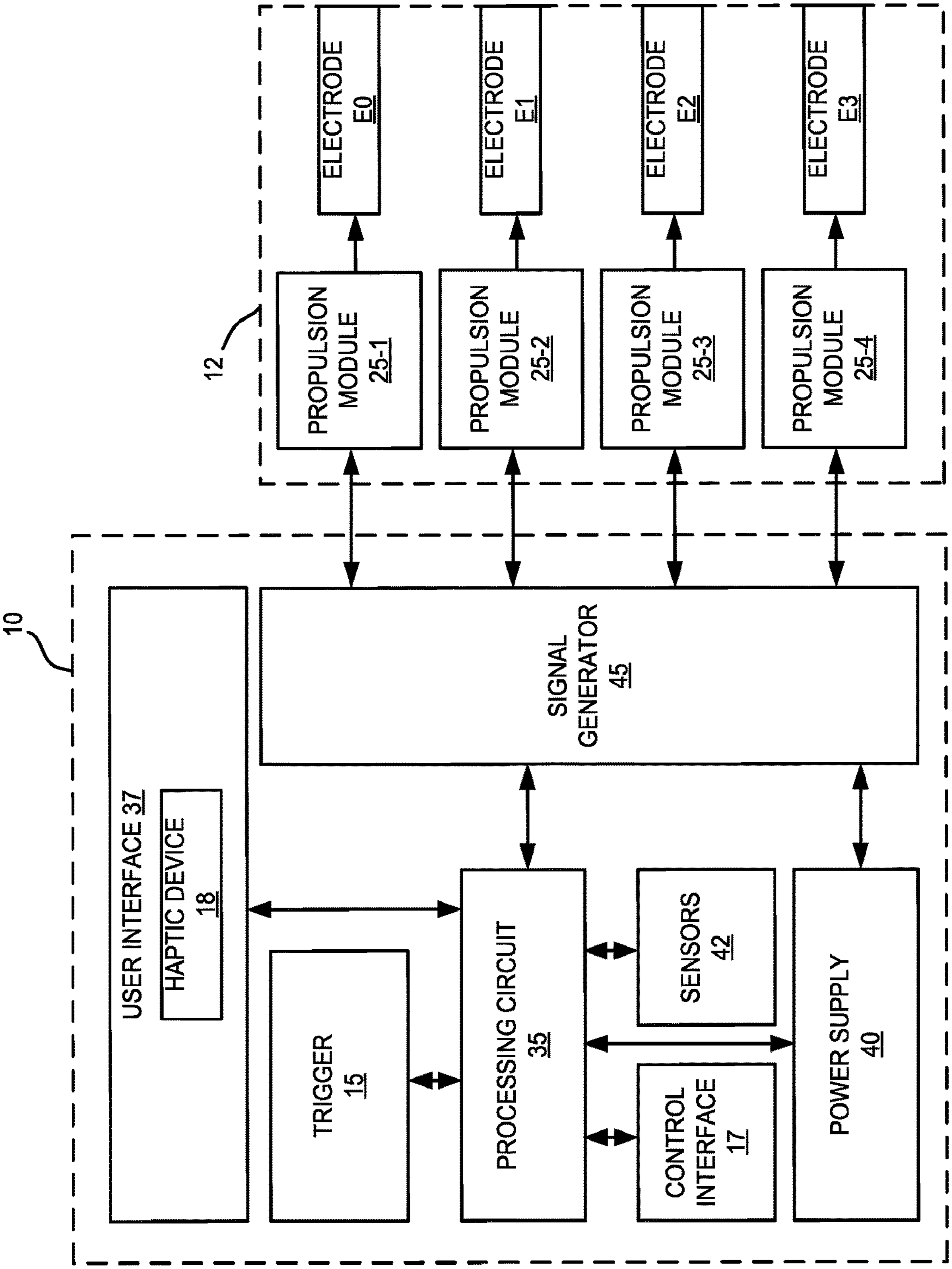
FIG. 2 is a schematic view of a CEW, in accordance with various embodiments.

In various embodiments, and with reference to FIGS. 1 and 2, a CEW 1 is disclosed. CEW 1 may be similar to, or have similar aspects and/or components with, any CEW discussed herein. CEW 1 may comprise a housing 10 and a magazine 12. It should be understood by one skilled in the art that FIG. 2 is a schematic representation of CEW 1, and one or more of the components of CEW 1 may be located in any suitable position within, or external to, housing 10.

Housing 10 may be configured to house various components of CEW 1 that are configured to enable deployment of magazine 12, provide an electrical current to magazine 12, and otherwise aid in the operation of CEW 1, as discussed further herein. Although depicted as a firearm in FIG. 1, housing 10 may comprise any suitable shape and/or size. Housing 10 may comprise a handle end opposite a deployment end. A deployment end may be configured, and sized and shaped, to receive one or more magazine 12. A handle end may be sized and shaped to be held in a hand of a user. For example, a handle end may be shaped as a handle to enable hand-operation of CEW 1 by the user. In various embodiments, a handle end may also comprise contours shaped to fit the hand of a user, for example, an ergonomic grip. A handle end may include a surface coating, such as, for example, a non-slip surface, a grip pad, a rubber texture, and/or the like. As a further example, a handle end may be wrapped in leather, a colored print, and/or any other suitable material, as desired.

In various embodiments, housing 10 may comprise various mechanical, electronic, and/or electrical components configured to aid in performing the functions of CEW 1. For example, housing 10 may comprise one or more triggers 15, control interfaces 17, processing circuits 35, power supplies 40, and/or signal generators 45. Housing 10 may include a guard (e.g., trigger guard). A guard may define an opening formed in housing 10. A guard may be located on a center region of housing 10 (e.g., as depicted in FIG. 1), and/or in any other suitable location on housing 10. Trigger 15 may be disposed within a guard. A guard may be configured to protect trigger 15 from unintentional physical contact (e.g., an unintentional activation of trigger 15). A guard may surround trigger 15 within housing 10.

In various embodiments, trigger 15 be coupled to an outer surface of housing 10, and may be configured to move, slide, rotate, or otherwise become physically depressed or moved upon application of physical contact. For example, trigger 15 may be actuated by physical contact applied to trigger 15 from within a guard. Trigger 15 may comprise a mechanical or electromechanical switch, button, trigger, or the like. For example, trigger 15 may comprise a switch, a pushbutton, and/or any other suitable type of trigger. Trigger 15 may be mechanically and/or electronically coupled to processing circuit 35. In response to trigger 15 being activated (e.g., depressed, pushed, etc. by the user), processing circuit 35 may enable deployment of (or cause deployment of) one or more magazine 12 from CEW 1, as discussed further herein.

In various embodiments, power supply 40 may be configured to provide power to various components of CEW 1. For example, power supply 40 may provide energy for operating the electronic and/or electrical components (e.g., parts, subsystems, circuits, etc.) of CEW 1 and/or one or more magazine 12. Power supply 40 may provide electrical power. Providing electrical power may include providing a current at a voltage. Power supply 40 may be electrically coupled to processing circuit 35 and/or signal generator 45. In various embodiments, in response to a control interface comprising electronic properties and/or components, power supply 40 may be electrically coupled to the control interface. In various embodiments, in response to trigger 15 comprising electronic properties or components, power supply 40 may be electrically coupled to trigger 15. Power supply 40 may provide an electrical current at a voltage. Electrical power from power supply 40 may be provided as a direct current ("DC"). Electrical power from power supply 40 may be provided as an alternating current ("AC"). Power supply 40 may include a battery. The energy of power supply 40 may be renewable or exhaustible, and/or replaceable. For example, power supply 40 may comprise one or more rechargeable or disposable batteries. In various embodiments, the energy from power supply 40 may be converted from one form (e.g., electrical, magnetic, thermal) to another form to perform the functions of a system.

Power supply 40 may provide energy for performing the functions of CEW 1. For example, power supply 40 may provide the electrical current to signal generator 45 that is provided through a target to impede locomotion of the target (e.g., via magazine 12). Power supply 40 may provide the energy for a stimulus signal. Power supply 40 may provide the energy for other signals, including an ignition signal, as discussed further herein.

In various embodiments, processing circuit 35 may comprise any circuitry, electrical components, electronic components, software, and/or the like configured to perform various operations and functions discussed herein. For example, processing circuit 35 may comprise a processing circuit, a processor, a digital signal processor, a microcontroller, a microprocessor, an application specific integrated circuit (ASIC), a programmable logic device, logic circuitry, state machines, MEMS devices, signal conditioning circuitry, communication circuitry, a computer, a computer-based system, a radio, a network appliance, a data bus, an address bus, and/or any combination thereof. In various embodiments, processing circuit 35 may include passive electronic devices (e.g., resistors, capacitors, inductors, etc.) and/or active electronic devices (e.g., op amps, comparators, analog-to-digital converters, digital-to-analog converters, programmable logic, SRCs, transistors, etc.). In various embodiments, processing circuit 35 may include data buses, output ports, input ports, timers, memory, arithmetic units, and/or the like.

In various embodiments, processing circuit 35 may include signal conditioning circuitry. Signal conditioning circuitry may include level shifters to change (e.g., increase, decrease) the magnitude of a voltage (e.g., of a signal) before receipt by processing circuit 35 or to shift the magnitude of a voltage provided by processing circuit 35.

In various embodiments, processing circuit 35 may be configured to control and/or coordinate operation of some or all aspects of CEW 1. For example, processing circuit 35 may include (or be in communication with) memory configured to store data, programs, and/or instructions. The memory may comprise a tangible non-transitory computer-readable memory. Instructions stored on the tangible non-transitory memory may allow processing circuit 35 to perform various operations, functions, and/or steps, as described herein.

In various embodiments, the memory may comprise any hardware, software, and/or database component capable of storing and maintaining data. For example, a memory unit may comprise a database, data structure, memory component, or the like. A memory unit may comprise any suitable non-transitory memory known in the art, such as, an internal memory (e.g., random access memory (RAM), read-only memory (ROM), solid state drive (SSD), etc.), removable memory (e.g., an SD card, an xD card, a CompactFlash card, etc.), or the like.

Processing circuit 35 may be configured to provide and/or receive electrical signals whether digital and/or analog in form. Processing circuit 35 may provide and/or receive digital information via a data bus using any protocol. Processing circuit 35 may receive information, manipulate the received information, and provide the manipulated information. Processing circuit 35 may store information and retrieve stored information. Information received, stored, and/or manipulated by processing circuit 35 may be used to perform a function, control a function, and/or to perform an operation or execute a stored program.

Processing circuit 35 may control the operation and/or function of other circuits and/or components of CEW 1. Processing circuit 35 may receive status information regarding the operation of other components, perform calculations with respect to the status information, and provide commands (e.g., instructions) to one or more other components. Processing circuit 35 may command another component to start operation, continue operation, alter operation, suspend operation, cease operation, or the like. Commands and/or status may be communicated between processing circuit 35 and other circuits and/or components via any type of bus (e.g., SPI bus) including any type of data/address bus.

In various embodiments, processing circuit 35 may be mechanically and/or electronically coupled to trigger 15. Processing circuit 35 may be configured to detect an activation, actuation, depression, input, etc. (collectively, an "activation event") of trigger 15. In response to detecting the activation event, processing circuit 35 may be configured to perform various operations and/or functions, as discussed further herein. Processing circuit 35 may also include a sensor (e.g., a trigger sensor) attached to trigger 15 and configured to detect an activation event of trigger 15. The sensor may comprise any suitable sensor, such as a mechanical and/or electronic sensor capable of detecting an activation event in trigger 15 and reporting the activation event to processing circuit 35.

In various embodiments, processing circuit 35 may be mechanically and/or electronically coupled to control interface 17. Processing circuit 35 may be configured to detect an activation, actuation, depression, input, etc. (collectively, a "control event") of control interface 17. In response to detecting the control event, processing circuit 35 may be configured to perform various operations and/or functions, as discussed further herein. Processing circuit 35 may also include a sensor (e.g., a control sensor) attached to control interface 17 and configured to detect a control event of control interface 17. The sensor may comprise any suitable mechanical and/or electronic sensor capable of detecting a control event in control interface 17 and reporting the control event to processing circuit 35.

In various embodiments, processing circuit 35 may be electrically and/or electronically coupled to power supply 40. Processing circuit 35 may receive power from power supply 40. The power received from power supply 40 may be used by processing circuit 35 to receive signals, process signals, and transmit signals to various other components in CEW 1. Processing circuit 35 may use power from power supply 40 to detect an activation event of trigger 15, a control event of control interface 17, or the like, and generate one or more control signals in response to the detected events. The control signal may be based on the control event and the activation event. The control signal may be an electrical signal.

In various embodiments, processing circuit 35 may be electrically and/or electronically coupled to signal generator 45. Processing circuit 35 may be configured to transmit or provide control signals to signal generator 45 in response to detecting an activation event of trigger 15. Multiple control signals may be provided from processing circuit 35 to signal generator 45 in series. In response to receiving the control signal, signal generator 45 may be configured to perform various functions and/or operations, as discussed further herein.

In various embodiments, signal generator 45 may be configured to receive one or more control signals from processing circuit 35. Signal generator 45 may provide an ignition signal to magazine 12 based on the control signals. Signal generator 45 may be electrically and/or electronically coupled to processing circuit 35 and/or magazine 12. Signal generator 45 may be electrically coupled to power supply 40. Signal generator 45 may use power received from power supply 40 to generate an ignition signal. For example, signal generator 45 may receive an electrical signal from power supply 40 that has first current and voltage values. Signal generator 45 may transform the electrical signal into an ignition signal having second current and voltage values. The transformed second current and/or the transformed second voltage values may be different from the first current and/or voltage values. The transformed second current and/or the transformed second voltage values may be the same as the first current and/or voltage values. Signal generator 45 may temporarily store power from power supply 40 and rely on the stored power entirely or in part to provide the ignition signal. Signal generator 45 may also rely on received power from power supply 40 entirely or in part to provide the ignition signal, without needing to temporarily store power.

Signal generator 45 may be controlled entirely or in part by processing circuit 35. In various embodiments, signal generator 45 and processing circuit 35 may be separate components (e.g., physically distinct and/or logically discrete). Signal generator 45 and processing circuit 35 may be a single component. For example, a control circuit within housing 10 may at least include signal generator 45 and processing circuit 35. The control circuit May also include other components and/or arrangements, including those that further integrate corresponding function of these elements into a single component or circuit, as well as those that further separate certain functions into separate components or circuits.

Signal generator 45 may be controlled by the control signals to generate an ignition signal having a predetermined current value or values. For example, signal generator 45 may include a current source. The control signal may be received by signal generator 45 to activate the current source at a current value of the current source. An additional control signal may be received to decrease a current of the current source. For example, signal generator 45 may include a pulse width modification circuit coupled between a current source and an output of the control circuit. A second control signal may be received by signal generator 45 to activate the pulse width modification circuit, thereby decreasing a non-zero period of a signal generated by the current source and an overall current of an ignition signal subsequently output by the control circuit. The pulse width modification circuit may be separate from a circuit of the current source or, alternatively, integrated within a circuit of the current source. Various other forms of signal generators 45 may alternatively or additionally be employed, including those that apply a voltage over one or more different resistances to generate signals with different currents. In various embodiments, signal generator 45 may include a high-voltage module configured to deliver an electrical current having a high voltage. In various embodiments, signal generator 45 may include a low-voltage module configured to deliver an electrical current having a lower voltage, such as, for example, 2,000 volts.

Responsive to receipt of a signal indicating activation of trigger 15 (e.g., an activation event), a control circuit provides an ignition signal to magazine 12 (or an electrode in magazine 12). For example, signal generator 45 may provide an electrical signal as an ignition signal to magazine 12 in response to receiving a control signal from processing circuit 35. In various embodiments, the ignition signal may be separate and distinct from a stimulus signal. For example, a stimulus signal in CEW 1 may be provided to a different circuit within magazine 12, relative to a circuit to which an ignition signal is provided. Signal generator 45 may be configured to generate a stimulus signal. In various embodiments, a second, separate signal generator, component, or circuit (not shown) within housing 10 may be configured to generate the stimulus signal. Signal generator 45 may also provide a ground signal path for magazine 12, thereby completing a circuit for an electrical signal provided to magazine 12 by signal generator 45. The ground signal path may also be provided to magazine 12 by other elements in housing 10, including power supply 40.

In various embodiments, a bay 11 of housing 10 may be configured (to receive one or more magazine 12. Bay 11 may comprise an opening in an end of housing 10 sized and shaped to receive one or more magazine 12. Bay 11 may include one or more mechanical features configured to removably couple one or more magazine 12 within bay 11. Bay 11 of housing 10 may be configured to receive a single magazine, two magazines, three magazines, nine magazines, or any other number of magazines.

Magazine 12 may comprise one or more propulsion modules 25 and one or more electrodes E. For example, a magazine 12 may comprise a single propulsion module 25 configured to deploy a single electrode E. As a further example, a magazine 12 may comprise a single propulsion module 25 configured to deploy a plurality of electrodes E. As a further example, a magazine 12 may comprise a plurality of propulsion modules 25 and a plurality of electrodes E, with each propulsion module 25 configured to deploy one or more electrodes E. In various embodiments, and as depicted in FIG. 2, magazine 12 may comprise a first propulsion module 25-1 configured to deploy a first electrode E0, a second propulsion module 25-2 configured to deploy a second electrode E1, a third propulsion module 25-3 configured to deploy a third electrode E2, and a fourth propulsion module **25-*n*** configured to deploy a fourth electrode En. Each series of propulsion modules and electrodes may be contained in the same and/or separate magazines.

In various embodiments, a propulsion module 25 may be coupled to, or in communication with one or more electrodes E in magazine 12. In various embodiments, magazine 12 may comprise a plurality of propulsion modules 25, with each propulsion module 25 coupled to, or in communication with, one or more electrodes E. A propulsion module 25 may comprise any device, propellant (e.g., air, gas, etc.), primer, or the like capable of providing a propulsion force in magazine 12. The propulsion force may include an increase in pressure caused by rapidly expanding gas within an area or chamber. The propulsion force may be applied to one or more electrodes E in magazine 12 to cause the deployment of the one or more electrodes E. A propulsion module 25 may provide the propulsion force in response to magazine 12 receiving an ignition signal, as previously discussed.

In various embodiments, the propulsion force may be directly applied to one or more electrodes E. For example, a propulsion force from propulsion module 25-1 may be provided directly to first electrode E. A propulsion module 25 may be in fluid communication with one or more electrodes E to provide the propulsion force. For example, a propulsion force from propulsion module 25-1 may travel within a housing or channel of magazine 12 to first electrode E0. The propulsion force may travel via a manifold in magazine 12.

In various embodiments, the propulsion force may be provided indirectly to one or more electrodes E. For example, the propulsion force may be provided to a secondary source of propellant within propulsion system 125. The propulsion force may launch the secondary source of propellant within propulsion system 125, causing the secondary source of propellant to release propellant. A force associated with the released propellant may in turn provide a force to one or more electrodes E. A force generated by a secondary source of propellant may cause the one or more electrodes E to be deployed from the magazine 12 and CEW 1.

In various embodiments, each electrode E0, E1, E2, E3 may each comprise any suitable type of projectile. For example, one or more electrodes E may be or include a projectile, an electrode (e.g., an electrode dart), an entablement projectile, a payload projectile (e.g., comprising a liquid or gas substance), or the like. An electrode may include a spear portion, designed to pierce or attach proximate a tissue of a target in order to provide a conductive electrical path between the electrode and the tissue, as previously discussed herein.

Control interface 17 of CEW 1 may comprise, or be similar to, any control interface disclosed herein. In various embodiments, control interface 17 may be configured to control selection of firing modes in CEW 1. Controlling selection of firing modes in CEW 1 may include disabling firing of CEW 1 (e.g., a safety mode, etc.), enabling firing of CEW 1 (e.g., an active mode, a firing mode, an escalation mode, etc.), controlling deployment of magazine 12, and/or similar operations, as discussed further herein. In various embodiments, control interface 17 may also be configured to perform (or cause performance of) one or more operations that do not include the selection of firing modes. For example, control interface 17 may be configured to enable the selection of operating modes of CEW 1, selection of options within an operating mode of CEW 1, or similar selection or scrolling operations, as discussed further herein.

Control interface 17 may be located in any suitable location on or in housing 10. For example, control interface 17 may be coupled to an outer surface of housing 10. Control interface 17 may be coupled to an outer surface of housing 10 proximate trigger 15 and/or a guard of housing 10. Control interface 17 may be electrically, mechanically, and/or electronically coupled to processing circuit 35. In various embodiments, in response to control interface 17 comprising electronic properties or components, control interface 17 may be electrically coupled to power supply 40. Control interface 17 may receive power (e.g., electrical current) from power supply 40 to power the electronic properties or components.

Control interface 17 may be electronically or mechanically coupled to trigger 15. For example, and as discussed further herein, control interface 17 may function as a safety mechanism. In response to control interface 17 being set to a "safety mode," CEW 1 may be unable to launch electrodes from magazine 12. For example, control interface 17 may provide a signal (e.g., a control signal) to processing circuit 35 instructing processing circuit 35 to disable deployment of electrodes from magazine 12. As a further example, control interface 17 may electronically or mechanically prohibit trigger 15 from activating (e.g., prevent or disable a user from depressing trigger 15; prevent trigger 15 from launching an electrode; etc.).

Control interface 17 may comprise any suitable electronic or mechanical component capable of enabling selection of firing modes. For example, control interface 17 may comprise a fire mode selector switch, a safety switch, a safety catch, a rotating switch, a selection switch, a selective firing mechanism, and/or any other suitable mechanical control. As a further example, control interface 17 may comprise a slide, such as a handgun slide, a reciprocating slide, or the like. As a further example, control interface 17 may comprise a touch screen, user interface or display, or similar electronic visual component.

The safety mode may be configured to prohibit deployment of an electrode from magazine 12 in CEW 1. For example, in response to a user selecting the safety mode, control interface 17 may transmit a safety mode instruction to processing circuit 35. In response to receiving the safety mode instruction, processing circuit 35 may prohibit deployment of an electrode from magazine 12. Processing circuit

35 may prohibit deployment until a further instruction is received from control interface 17 (e.g., a firing mode instruction). As previously discussed, control interface 17 may also, or alternatively, interact with trigger 15 to prevent activation of trigger 15. In various embodiments, the safety mode may also be configured to prohibit deployment of a stimulus signal from signal generator 45, such as, for example, a local delivery.

The firing mode may be configured to enable deployment of one or more electrodes from magazine 12 in CEW 1. For example, and in accordance with various embodiments, in response to a user selecting the firing mode, control interface 17 may transmit a firing mode instruction to processing circuit 35. In response to receiving the firing mode instruction, processing circuit 35 may enable deployment of an electrode from magazine 12. In that regard, in response to trigger 15 being activated, processing circuit 35 may cause the deployment of one or more electrodes. Processing circuit 35 may enable deployment until a further instruction is received from control interface 17 (e.g., a safety mode instruction). As a further example, and in accordance with various embodiments, in response to a user selecting the firing mode, control interface 17 may also mechanically (or electronically) interact with trigger 15 of CEW 1 to enable activation of trigger 15.

In various embodiments, CEW 1 may deliver a stimulus signal via a circuit that includes signal generator 45 positioned in the handle of CEW 1. An interface (e.g., cartridge interface, magazine interface, etc.) on each magazine 12 inserted into housing 10 electrically couples to an interface (e.g., handle interface, housing interface, etc.) in handle housing 10. Signal generator 45 couples to each magazine 12, and thus to the electrodes E, via the handle interface and the magazine interface. A first filament couples to the interface of the magazine 12 and to a first electrode. A second filament couples to the interface of the magazine 12 and to a second electrode. The stimulus signal travels from signal generator 45, through the first filament and the first electrode, through target tissue, and through the second electrode and second filament back to signal generator 45.

In various embodiments, CEW 1 may comprise one or more user interfaces 37. User interface 37 may be configured to receive an input from a user of CEW 1 and/or transmit an output to the user of CEW 1. User interface 37 may be located in any suitable location on or in housing 10. For example, user interface 37 may be coupled to an outer surface of housing 10, or extend at least partially through the outer surface of housing 10. User interface 37 may be electrically, mechanically, and/or electronically coupled to processing circuit 35. In various embodiments, in response to user interface 37 comprising electronic or electrical properties or components, user interface 37 may be electrically coupled to power supply 40. User interface 37 may receive power (e.g., electrical current) from power supply 40 to power the electronic properties or components.

In various embodiments, user interface 37 may comprise one or more components configured to receive an input from a user. For example, user interface 37 may comprise one or more of an audio capturing module (e.g., microphone) configured to receive an audio input, a visual display (e.g., touchscreen, LCD, LED, etc.) configured to receive a manual input, a mechanical interface (e.g., button, switch, etc.) configured to receive a manual input, and/or the like. In various embodiments, user interface 37 may comprise one or more components configured to transmit or produce an output. For example, user interface 37 may comprise one or more of an audio output module (e.g., audio speaker) configured to output audio, a light-emitting component (e.g., flashlight, laser guide, etc.) configured to output light, a visual display (e.g., touchscreen, LCD, LED, etc.) configured to output a visual, and/or the like.

In various embodiments, user interface 37 may be configured to output an alert in response to CEW 1 detecting an event or event type. The event or event type may be detected by processing circuit 35. For example, the event or event type may comprise CEW 1 being inserted in and/or removed from a holster. In another example, the event or event type may comprise CEW 1 determining a holster type of a holster of the CEW 1, e.g., such that an alert is generated responsive to CEW 1 detecting a given holster type, a change in holster type from a previous holster of CEW 1, or the like. In other examples, the event or event type may alternately or additionally comprise a stimulus signal being remotely delivered to a target from CEW 1, a connection status for one or more electrodes E of CEW 1, and/or a communication or notification received by one or more entities communicatively coupled to CEW 1. While shown as a separate element in FIG. 2, user interface 37 may comprise and/or perform functions of trigger 15 and/or control interface 17 in embodiments according to various aspects of the present disclosure.

In embodiments, user interface 37 may comprise one or more alert devices configured to provide an alert to a user of CEW 1. An alert device may comprise one or more hardware and/or software components configured to generate and output the alert. The alert may include an audio output, visual output, and/or haptic output from CEW 1. User interface 37 may comprise hardware and/or software components configured to generate and output an audio output, visual output, and/or haptic output. For example, in the embodiment of FIG. 2, user interface may comprise a haptic feedback device or haptic device 18. In other embodiments, user interface 37 may additionally or instead comprise other alert devices, such as an audio device and/or a light device. The alert device may be disposed on an interior or exterior surface of the CEW 1. The alert device may receive information from processing circuit 35 to cause an alert to be generated. Processing circuit 35 may provide one or more control signals to alert device(s) of user interface 37 to cause the alert to be generated. Haptic device 18 may comprise separate components and/or systems or may at least partially or wholly include the same components and/or systems as one or more other alert devices of CEW 1. For example, haptic device 18 may comprise separate processing circuits and/or logic as an audio and/or light device, the same processing circuits and/or logic as an audio and/or light device, and/or may rely on processing circuit 35 to provide processing power and/or logic.

In accordance with various embodiments, processing circuit 35 may be configured to control and/or coordinate operation of some or all aspects of an alert device of user interface 37. Processing circuit 35 may include (or be in communication with) memory configured to store data, programs, and/or instructions. The memory may comprise a tangible non-transitory computer-readable memory. Instructions stored on the tangible non-transitory memory may allow processing circuit 35 to perform various operations, functions, and/or steps, as described herein. For example, in response to processing circuit 35 executing the instructions on the tangible non-transitory memory, processing circuit 35 may communicate with an alert device of user interface 37 to output an alert (e.g., a visual output, haptic output, and/or an audio output). In various embodiments, processing circuit 35 may execute the instructions in response to operation of a control interface and/or trigger 15 of CEW 1.

Haptic device 18, also referred to herein as a haptic feedback device, may be configured to generate and/or output a haptic output (e.g., a haptic alert, a haptic feedback alert, a haptic output alert, etc.). For example, the haptic output may comprise vibration, motions, or other contact forces that are applied a user mechanically coupled to CEW 1. Haptic device 18 may comprise one or more components configured to generate and/or output haptic feedback such as, for example, eccentric rotating masses, piezoelectric actuators, linear resonant actuators, servomotors, haptic drivers, and/or haptic actuators.

Haptic device 18 may be configured to output the haptic output from or through an exterior surface of CEW 1. For example, haptic device 18 may be configured to output the haptic output at a surface of a grip end of CEW 1 proximate a user of CEW 1. In that regard, haptic device 18 may be at least partially located proximate a grip end of CEW 1 opposite a deployment end of CEW 1. For example, an actuator of haptic device 18 may be coupled to a surface of a grip end of CEW 1. As a further example, an actuator of haptic device 18 may be located at any other exterior surface position on a CEW whereby a user of the CEW may perceive the haptic output. As a further example, an actuator of haptic device 18 may be located at an internal location within CEW 1 and configured to output a haptic output from CEW 1 at a sufficient intensity that a user of CEW 1 may perceive the haptic output.

The haptic output may comprise a frequency and intensity perceptible by a human somatosensory system. For example, a frequency of a haptic output may be between 1 and 1000 hertz. In embodiments, different haptic alerts may comprise haptic outputs having different frequencies and/or intensities.

In various embodiments, haptic device 18 may output a suitable or desired haptic output, or series of haptic outputs. A haptic output may comprise a pulse of vibration. A series of haptic outputs may comprise a series of continuous or intermittent vibrational pulses. A haptic output may differ in accordance with a detected status of CEW 1. For example, the haptic output may be provided at a greater intensity and/or a greater duration responsive to CEW 1 being removed from a holster or being inserted into a holster having a given holster type.

In various embodiments, haptic device 18 may output the haptic output based on a haptic output characteristic. The haptic output characteristic may define characteristics or properties of the haptic output. A haptic output characteristic may define an output time (e.g., a haptic output time). The output time may define a period of time that haptic device 18 outputs the haptic output (e.g., 1 second, 2 seconds, 3 seconds, 5 seconds, 10 seconds, etc.). In various embodiments, the output time may be defined by the period of time during which an event and/or status is detected by processing circuit 135. In various embodiments, the output time may be defined by the emitting time (e.g., a haptic output time may be the same as a visual output time and/or audio output time). In embodiments, different haptic output characteristics may enable one or more statuses of a CEW 1 (e.g., being fully inserted in a holster, being removed from a holster, being inserted into a holster having a given holster type) to be differentiated via a human tactile system.

A haptic output characteristic may define an output pattern (e.g., a haptic output pattern). The output pattern may define an order that one or more audio outputs are output in, in response to haptic device 18 being activated. In various embodiments, each haptic output in the output pattern may comprise a defined haptic output time (e.g., a first haptic output is associated with a first haptic output time, a second haptic output is associated with a second haptic output time, etc.). A haptic output characteristic may define an output intensity (e.g., a haptic output intensity, a haptic volume, etc.). In various embodiments, each haptic output in a haptic pattern may comprise a defined haptic output intensity (e.g., a first haptic output is associated with a first haptic output intensity, a second haptic output is associated with a second haptic output intensity, etc.). Different haptic outputs or haptic alerts may comprise different haptic output intensities and/or output patterns.

Instructions controlling haptic device 18 (e.g., haptic output instructions) may be stored in memory and executed by a processor (e.g., processing circuit 35), as previously discussed. The instructions may include one or more haptic output characteristics. In various embodiments, one or more haptic output characteristics may also be defined by physical characteristics and/or firmware of one or more components of haptic device 18.

In various embodiments, the haptic output time may be the same as a visual output time, an audio output time, and/or any other alert output time. In various embodiments, the haptic output time may be different from the visual output time, audio output time, and/or any other alert output time (e.g., the haptic output time may be shorter or longer than the visual output time and/or audio output time).

In some embodiments, and in response to an event, alert devices of user interface 37 may be activated in any order. Alternately or additionally, different combinations of alert devices of user interface 37 may be activated in accordance with different events.

In various embodiments, CEW 1 may comprise one or more sensors 42 configured to detect an event or event type. For example, sensors 42 may be configured to detect removal of CEW 1 from holster. Sensors 42 may comprise one or more standalone components in CEW 1, either partially or wholly, or may be at least partially or wholly integrated into another component of CEW 1, such as processing circuit 35. In some embodiments, sensors 42 may comprise a gyroscope or other sensor configured to detect movement, direction of movement, and/or velocity of movement by the CEW 1. In some embodiments, sensors 42 may alternately or additionally comprise a Hall effect sensor or proximity sensor configured to detect proximity to holster or other item having magnetic elements. In some embodiments, a sensor of the one or more sensors 42 may comprise a bipolar sensor configured to detect different polarities of magnetic elements positioned proximate to CEW 1. For example, a sensor of sensors 42 may comprise a bipolar Hall effect sensor configured to a first polarity of a first magnetic element and a second polarity of a second magnetic element different from the first polarity. The first polarity may comprise a positive or negative polarity and the second polarity may comprise the other of the negative polarity and the positive polarity different from the first polarity. In another example, sensors 42 may comprise one or more communications interfaces. The communications interface (s) may enable WI-FI, BLUETOOTH, or other long- or short-distance wireless communications to other entities, configured to interact with other entities within a given proximity, e.g., a smart watch. In another example, sensor 42 may comprise a fingerprint sensor or other sensor configured to detect touch on a portion, e.g., a handle, or all of the CEW 1. Sensor 42 and/or processing circuit 35 may process detected information to detect CEW 1 has been removed from a provided holster. Responsive to detecting removal of CEW 1 from the provided holster, processing circuit 35 may be configured to perform one or more operations to provide an alert, including as further disclosed herein.

In other embodiments, sensors 42 may alternately or additionally detect other events or event types. For example, sensors 42 may be configured to detect insertion of CEW 1 into holster, proximity of CEW 1 to holster having a given holster type, or the like.

Figure 3A:
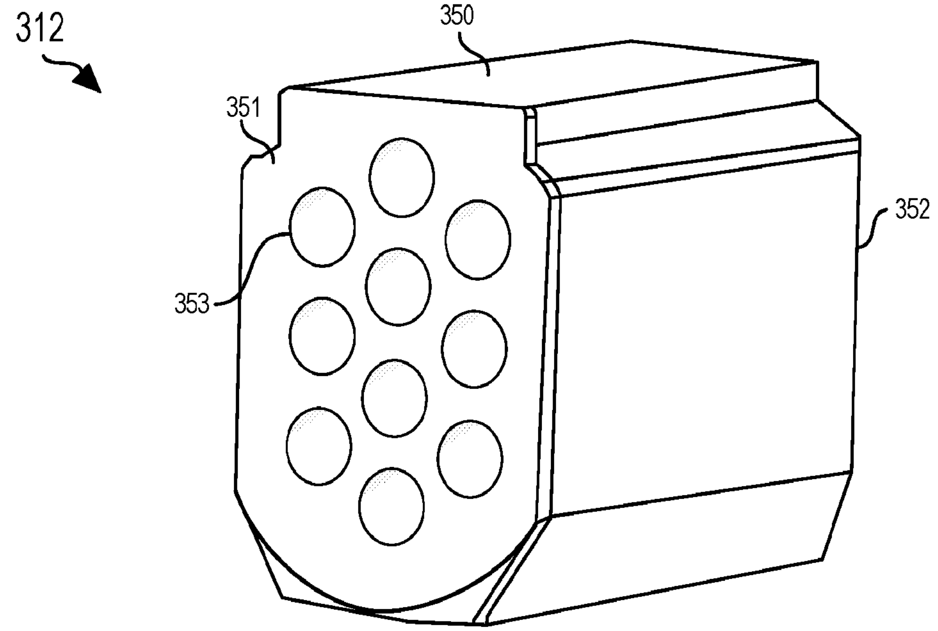
FIG. 3A is a front perspective view of a magazine for a CEW, in accordance with various embodiments.
Figure 3B:
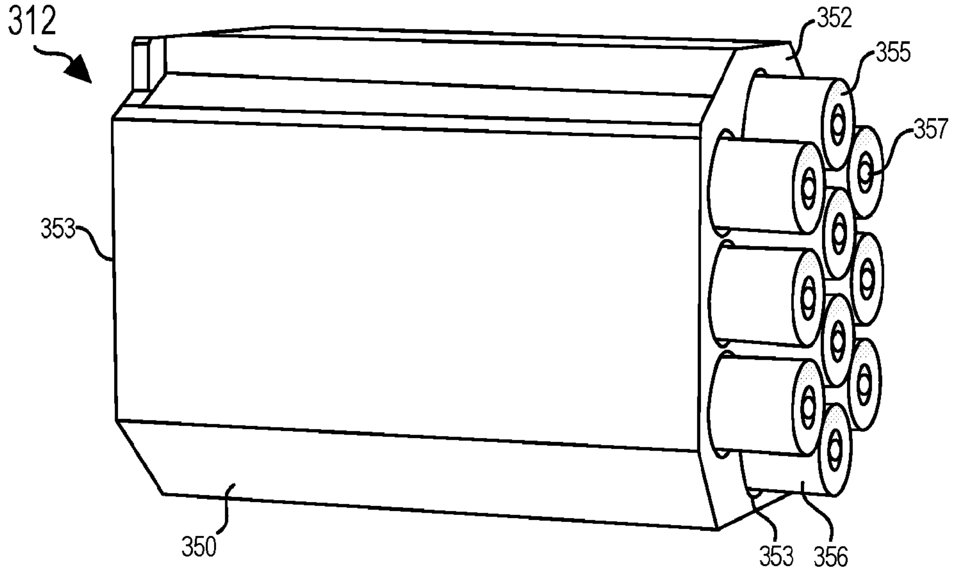
FIG. 3B is a rear perspective view of a magazine for a CEW, in accordance with various embodiments.

In various embodiments, and with reference to FIGS. 3A and 3B, a magazine 312 for a CEW is disclosed. Magazine 312 may be similar to any other magazine, deployment unit, or the like disclosed herein.

Magazine 312 may comprise a housing 350 sized and shaped to be inserted into the bay 11 of a CEW handle, as previously discussed. Housing 350 may comprise a first end 351 (e.g., a deployment end, a front end, etc.) opposite a second end 352 (e.g., a loading end, a rear end, etc.). Magazine 312 may be configured to permit launch of one or more electrodes from first end 351 (e.g., electrodes are launched through first end 351). Magazine 312 may be configured to permit loading of one or more electrodes from second end 351. Second end 351 may also be configured to permit provision of stimulus signals from the CEW to the one or more electrodes. In some embodiments, magazine 312 may also be configured to permit loading of one or more electrodes from first end 351.

In various embodiments, housing 350 may define one or more bores 353. A bore 353 may comprise an axial opening through housing 350, defined and open on first end 351 and/or second end 352. Each bore 353 may be configured to receive an electrode (or cartridge containing an electrode). Each bore 353 may be sized and shaped accordingly to receive and house an electrode (or cartridge containing an electrode) prior to and during deployment of the electrode from magazine 312. Each bore 353 may comprise any suitable deployment angle. One or more bores 353 may comprise similar deployment angles. One or more bores 353 may comprise different deployment angles. Housing 350 may comprise any suitable or desired number of bores 353, such as, for example, two bores, five bores, nine bores, ten bores (e.g., as depicted), and/or the like.

In various embodiments, magazine 350 may be configured to receive one or more cartridges 355. A cartridge 355 may comprise a body 356 housing an electrode and one or more components necessary to deploy the electrode from body 356. For example, cartridge 355 may comprise an electrode and a propulsion module. The electrode may be similar to any other electrode, projectile, or the like disclosed herein. The propulsion module may be similar to any other propulsion module, primer, or the like disclosed herein.

In various embodiments, cartridge 355 may comprise a cylindrical outer body 356 defining a hollow inner portion. The hollow inner portion may house an electrode (e.g., an electrode, a spear, filament wire, etc.). The hollow inner portion may house a propulsion module configured to deploy the electrode from a first end of the cylindrical outer body 356. Cartridge 355 may include a piston positioned adjacent a second end of the electrode. Cartridge 355 may have the propulsion module positioned such that the piston is located between the electrode and the propulsion module. Cartridge 355 may also have a wad positioned adjacent the piston, where the wad is located between the propulsion module and the piston.

In various embodiments, a cartridge 355 may comprise a contact 357 on an end of body 356. Contact 357 may be configured to allow cartridge 355 to receive an electrical signal from a CEW handle. For example, contact 357 may comprise an electrical contact configured to enable the completion of an electrical circuit between cartridge 355 and a signal generator of the CEW handle. In that regard, contact 357 may be configured to transmit (or provide) a stimulus signal from the CEW handle to the electrode. As a further example, contact 357 may be configured to transmit (or provide) an electrical signal (e.g., an ignition signal) from the CEW handle to a propulsion module within the cartridge 355. For example, contact 357 may be configured to transmit (or provide) the electrical signal to a conductor of the propulsion module, thereby causing the conductor to heat up and ignite a pyrotechnic material inside the propulsion module. Ignition of the pyrotechnic material may cause the propulsion module to deploy (e.g., directly or indirectly) the electrode from the cartridge 355.

In operation, a cartridge 355 may be inserted into a bore 353 of a magazine 312. The magazine 312 may be inserted into the bay 11 of a CEW handle. The CEW may be operated to deploy an electrode from the cartridge 355 in magazine 312. Magazine 312 may be removed from the bay 11 of the CEW handle. The cartridge 355 (e.g., a used cartridge, a spent cartridge, etc.) may be removed from the bore 353 of magazine 312. A new cartridge 355 may then be inserted into the same bore 353 of magazine 312 for additional deployments. The number of cartridges 355 that magazine 350 is capable of receiving may be dependent on a number of bores 353 in housing 350. For example, in response to housing 350 comprising ten bores 353, magazine 350 may be configured to receive at most ten cartridges 355 at the same time. As a further example, in response to housing 350 comprising two bores 353, magazine 350 may be configured to receive at most two cartridges 355 at the same time.

Magazines of conducted electrical weapons (CEW) comprise a set of magnetic elements having positions, polarities, and magnitudes corresponding to a type of magazine. The CEW uses sensors to detect an indicator magnet indicating that a magazine is inserted into a bay 11 of the CEW. The CEW additionally uses sensors to detect information about the set of magnetic elements and determines, based on the detected information, a type of the magazine. Types of magazines can determine a number of factors relevant to operation of the CEW in conjunction with a given magazine, such as a number of cartridges acceptable in the magazine, a type of cartridges acceptable within a magazine, capabilities of a magazine, and/or the like.

Figure 4:
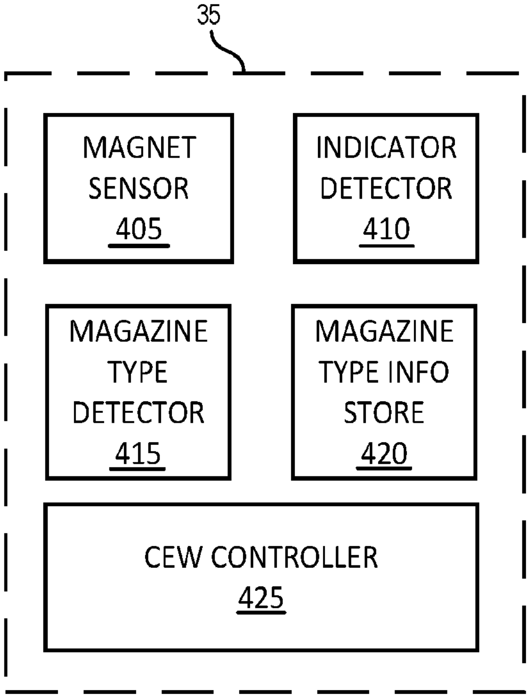
FIG. 4 is a block diagram illustrating an example processing unit for a CEW, in accordance with various embodiments.

FIG. 4 is a block diagram illustrating an example processing circuit 35 for a CEW, in accordance with various embodiments. In the embodiment of FIG. 4, the example processing circuit 35 comprises a magnet sensor 405, an indicator detector 410, a magazine type detector 415, a magazine type info store 420, and a CEW controller 425. In other embodiments, the processing circuit may comprise additional, fewer, or different modules, and modules may perform differently than described herein.

The magnet sensor 405 comprises one or more sensors configured to detect magnetic elements in magazines received in a bay 11 of the CEW 1. In some embodiments, the one or more sensors detect one or more physical properties of the magazine. For example, in some embodiments, the one or more sensors are Hall effect sensors. In other embodiments, the one or more sensors may be magneto-resistive, magneto-diode, magneto-transistor, or other types of magnetometers configured to detect magnetic elements in cartridges received in a bay 11 of the CEW 1. In other embodiments, the one or more sensors may additionally or instead detect other physical properties of the magazine 12, such as, for example, one or more of: Indica printed on the magazines, physical indents, extrusions, other markings on the magazines, or the like.

In some embodiments, the magnet sensor 405 is configured to, responsive to detecting one or more magnetic fields or other physical properties, capture and transmit information about the one or more detected magnetic fields or other physical properties to the indicator detector 410. Information about the one or more detected magnetic fields may comprise, for example, a position of a magnetic element causing the detected magnetic field; a polarity of the magnetic field; a magnitude of the magnetic field; and the like.

The indicator detector 410 receives information about one or more detected magnetic fields from the magnet sensor 405 and determines whether a detected magnetic field of the one or more detected magnetic fields corresponds to an indicator magnet. An indicator magnet (e.g., a first magnet) is a magnetic element in a magazine 12 that indicates to a processing circuit of a CEW 1 that the cartridge has been inserted to the bay 11 of the CEW. In some embodiments, the indicator magnet may have a fixed polarity. In some embodiments, the indicator magnet may have a fixed position on the magazine 12. In some embodiments, the indicator magnet may have a fixed magnitude. In other embodiments, the indicator magnet may have one of a set of fixed positions, magnitudes, and/or polarities, e.g., such that a magnetic field detected within a set of positions, magnitudes, and/or polarities indicate to the processing unit of the CEW 1 that the magazine 12 has been received by the CEW.

In some embodiments, the magazine type detector 415 performs a check for one or more additional magnetic elements (e.g., a second magnet, a third magnet, a fourth magnet, etc.) responsive to the indicator detector 410 detecting an indicator magnet and determines, based on one or more additional magnetic elements, a magazine type of a magazine 12 received by the CEW 1. In other embodiments wherein the magazine does not comprise an indicator magnet, the magazine type detector 415 performs a check for one or more magnetic elements responsive to the indicator detector 410 detecting a magnetic element of the one or more magnetic elements, e.g., a magnetic element that is not an indicator element. In other embodiments wherein the magazine does not comprise an indicator magnet, the magazine type detector 415 performs a check for one or more magnetic elements responsive to other stimuli, e.g., a magazine being inserted into a bay of the CEW 1, an action by a user of the CEW, an instruction received by a remote entity to perform the check, and the like.

In some embodiments, the magazine type detector 415 receives information describing one or more detected magnetic fields and accesses the magazine type info store 420 to determine a magazine type corresponding to the received information describing the one or more detected magnetic fields. The information describing the one or more magnetic fields may comprise a set of respective positions, polarities, and/or magnitudes corresponding to a set of magnetic elements. In some embodiments, e.g., in embodiments wherein the indicator magnet has a fixed position, polarity, and magnitude, the information describing the one or more magnetic fields may exclude information describing an indicator magnet. In other embodiments, the received information may comprise other information about physical properties of the received magazine 12, such as information describing indicia printed on the surface of the magazine, indents, extrusions, other markings on the surface of the magazine, and the like.

The magazine type info store 420 stores and maintains information describing magazine types and magnetic elements or other physical properties corresponding to the magazine types. For example, in some embodiments, magazines comprise three magnetic elements. The three magnetic elements may comprise one indicator magnet and two additional magnetic elements, or may comprise three magnetic elements without an indicator magnet. In other embodiments, magazines comprise fewer or more magnetic elements. Each magazine of a magazine type comprises a fixed set of positions, polarities, and/or magnitudes for each of the magnetic elements. The magazine type info store 420 maintains information describing each fixed set of positions, polarities, and/or magnitudes for known magazine types. As such, based on the information describing the one or more detected magnetic fields and information stored by the magazine type info store 420, the magazine type detector 415 identifies a magazine type having magnetic elements corresponding to the information.

In some embodiments, the magazine type info store 420 additionally stores and maintains information describing one or more additional properties of magazine types. For example, the magazine type info store 420 may identify a magazine type as comprising (or capable of accepting) a plurality of electrodes E. In another example, the magazine type info store 420 may store information describing a required method of propulsion for the magazine type, a required activation event, a particular type of cartridge, or the like. As a further example, the magazine type info store 420 may store information indicating a type of cartridges acceptable by the magazine, such as a standard cartridge, a virtual reality cartridge, and/or the like.

The CEW controller 425 performs one or more actions responsive to a determination of a magazine type of a magazine 12 received by a CEW 1. In some embodiments, the CEW controller 425 may modify one or more settings or parameters of the CEW 1, such as modifying a number of consecutive deployments of cartridges by the CEW prior to requiring a new cartridge or a new magazine, modifying a required activation event, modifying a control signal, modifying a propulsion event, and/or the like. In other embodiments, the CEW controller 425 may modify a display or control interface of the CEW 1, e.g., by displaying an identifier of the magazine type and/or a remaining number of cartridges and/or electrodes E in the magazine on a display of the CEW, a display of a client device communicatively coupled to the CEW, or the like. In other embodiments, the CEW controller 425 may modify an aiming apparatus of the CEW based on electrode deployment trajectories associated with one or more bores of the magazine type. For example, modifying the aiming apparatus may comprise adjusting one or more aiming lasers to accurately align with the electrode deployment trajectories associated with one or more bores of the magazine type. In other embodiments, the CEW controller 425 may modify (e.g., enable or disable) one or more accessory components of the CEW, such as, for example, a flashlight, an aiming laser, an audio output component, and/or the like.

Figure 5:
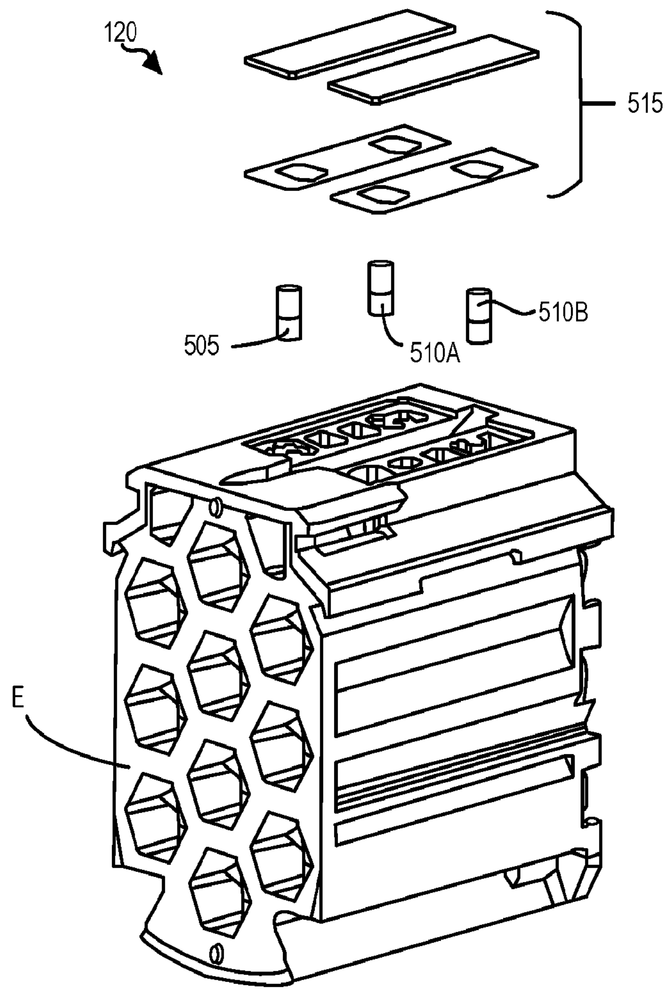
FIG. 5 is a perspective view of a magazine having magnets for type detection, in accordance with various embodiments.

FIG. 5 is a perspective view of a magazine having magnetic elements for type detection, in accordance with various embodiments. As discussed in conjunction with FIGS. 1-2, magazines 12 may comprise one or more electrodes E and are configured to be inserted into a bay 11 of a CEW 1. For example, a magazine 12 may comprise a single electrode E or may comprise a plurality of electrodes. Magazines 12 are associated with a magazine type, which identifies parameters associated with the magazine. For example, a magazine type may identify a number of electrodes E associated with the magazine 12 or with a cartridge of the magazine. In another example, a magazine type may identify other parameters associated with the magazine 12 as discussed in FIGS. 1-2, e.g., activation events, control signals, propulsion events or methods, and the like.

The magazine 12 comprises a set of magnetic elements 505, 510. In some embodiments, a first magnetic element is an indicator magnet 505. As discussed previously, the indicator magnet 405 is a magnetic element in a magazine 12 that indicates to a processing unit of a CEW 1 that the cartridge has been inserted to the bay 11 of the CEW. In some embodiments, the indicator magnet 405 may have fixed properties across one or more cartridge types, such as a fixed position on the cartridge, a fixed polarity, and/or a fixed magnitude, so as to be readily identifiable by the CEW 1. In other embodiments, the indicator magnet 505 may vary in position, polarity, and/or magnitude across one or more cartridge types.

One or more additional magnetic elements 510 (e.g., magnetic element 510A, magnetic element 510B, etc.) may have differing positions, polarities, and magnitudes across one or more cartridge types, such that each cartridge type corresponds to a unique set of properties of additional magnetic elements. For example, a first cartridge type may have an indicator magnet 505 having a fixed position, polarity, and magnitude, and additional magnetic elements 510A-B having a set of properties A and B, while a second cartridge type may have an indicator magnet 405 having the same fixed position, polarity, and magnitude, and additional magnetic elements 510 having sets of properties B and C. As shown in the embodiment of FIG. 5, the magazine 12 comprises one indicator magnet 505 and two additional magnetic elements 510A-B for a total of three magnetic elements. In other embodiments, the magazine 12 may comprise additional magnetic elements, fewer magnetic elements, and magnetic elements in positions different than illustrated in FIG. 5.

In some embodiments, the indicator magnet 505 and the one or more additional magnetic elements 510 are held within the magazine 12 by one or more mechanical components 515. In other embodiments, the indicator magnet 505 and the one or more additional magnetic elements 510 may instead or additionally be held within the magazine 12 using mechanical components not shown here, such as via clamping or other locking mechanisms within the magazine body. In other embodiments, the indicator magnet 505 and the one or more additional magnetic elements 510 may instead or additionally be held within the magazine 12 using other means, such as being magnetically fixed within the magazine, fixed using an adhesive, and/or the like.

In various embodiments, the indicator magnet 505 and/or the one or more additional magnetic elements 510 may be located in any suitable position within or on a magazine. For example, the indicator magnet 505 and/or the one or more additional magnetic elements 510 may be located in a position capable of enabling the indicator magnet 505 and/or the one or more additional magnetic elements 510 to interface with components of the CEW handle capable of determining the physical properties of the indicator magnet 505 and/or the one or more additional magnetic elements 510. For example, although depicted in FIG. 5 as being disposed proximate a top of a magazine, it should be understood that the indicator magnet 505 and/or the one or more additional magnetic elements 510 may also be disposed proximate a bottom of a magazine, a side of a magazine, a rear end of a magazine, and/or any other suitable position. Further, although depicted in FIG. 5 as the indicator magnet 505 and/or the one or more additional magnetic elements 510 each being disposed together, it should be understood that one or more of the indicator magnet 505 and/or the one or more additional magnetic elements 510 may also be positioned separately. For example, the indicator magnet 505 may be disposed in a first location on the magazine and the one or more additional magnetic elements 510 may be disposed in a second location on (or within) the magazine different from the first location. Similarly, and as a further example, one or more of the additional magnetic elements 510 may be disposed in different locations on (or within) the magazine.

In some embodiments, one or more of the indicator magnet 505 and/or the one or more additional magnetic elements 510 may be coupled to an exterior surface of the magazine. In some embodiments, one or more of the indicator magnet 505 and/or the one or more additional magnetic elements 510 may be disposed within the magazine. In some embodiments, one or more of the indicator magnet 505 and/or the one or more additional magnetic elements 510 may be disposed within the magazine and at least partially protrude (or be exposed) through an exterior surface of the magazine.

Figure 6:
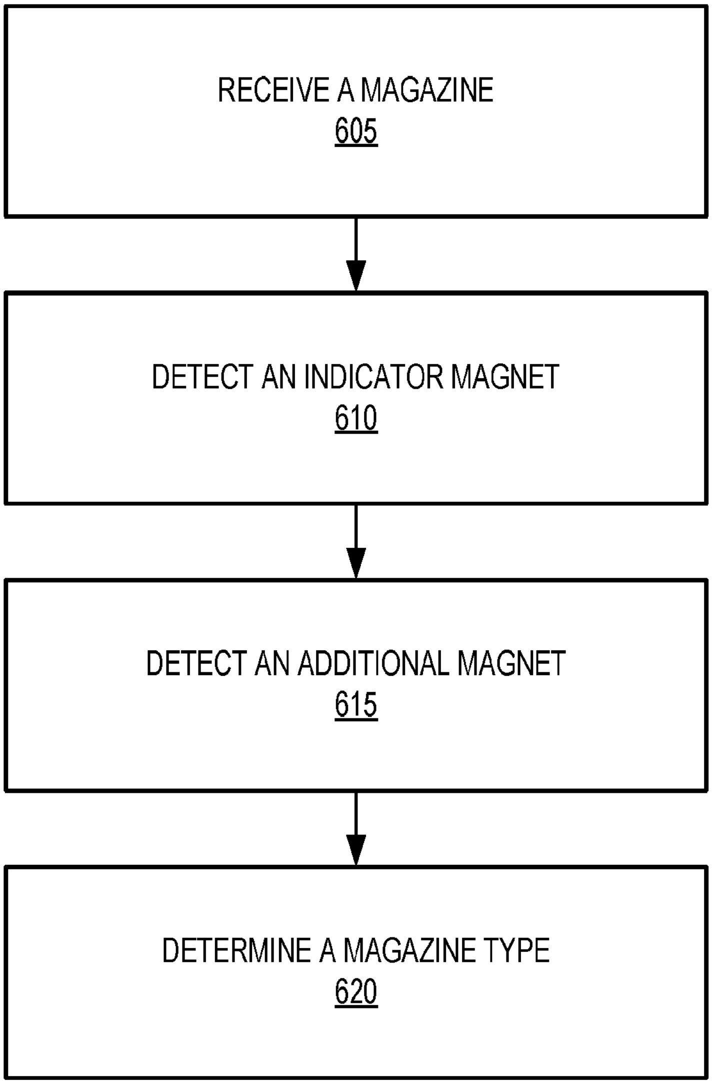
FIG. 6 is a flow chart illustrating a method for detecting magazine types by a CEW, in accordance with various embodiments.

FIG. 6 is a flow chart illustrating a method for detecting magazine types by a CEW, according to some embodiments. For example, and in accordance with various embodiments, the method may include one or more steps for detecting magnetic elements in cartridges and determining cartridge types based on the magnetic elements by a CEW. In other embodiments, the method may include one or more steps for detecting magnetic elements in cartridges to determine when cartridges are inserted to a CEW.

A CEW 1 comprises a bay 11 for receiving one or more magazines 12 and a housing 10 comprising one or more electrical components. The one or more electrical components comprise at least a processing circuit and one or more sensors for detecting magnetic elements 505, 510 and/or other physical properties of magazines within the CEW 1. The CEW 1 receives 605 a magazine 12 into the bay 11 of the CEW. In some embodiments, the bay 11 of the CEW 1 and/or the magazine 12 may comprise mechanical components for receiving the cartridge, aligning the cartridge, and/or locking the cartridge into place.

The CEW 1 may perform a check for one or more magnetic elements. The one or more magnetic elements may each have a physical property. The physical property may comprise a respective position on the magazine, a respective polarity, and/or the like. The check may be performed by the CEW by detecting the one or more magnets, detecting each physical property of the one or more magnets, and/or the like, in accordance with various embodiments.

For example, the CEW 1 detects 610 an indicator magnet 505 (e.g., a first magnet) of the magazine 12. The indicator magnet 505 is a first magnet in the magazine 12 having a first position and a first polarity. In some embodiments, the indicator magnet 505 has a standard position and polarity across one or more magazine types.

For example, the CEW 1 detects 615 one or more additional magnets 510 (e.g., a second magnet, etc.). The CEW 1 may detect the one or more additional magnets 510 together with detecting the indicator magnet 505. The CEW 1 may detect the one or more additional magnets 510 responsive to detecting the indicator magnet 505. The one or more additional magnets 510 may have one or more respective positions on the cartridge and one or more respective polarities. The one or more respective positions may be a set of standard positions on a cartridge, and the one or more respective polarities may be positive, negative, or neutral, and may vary in magnitude.

The CEW 1 determines 620 a cartridge type of the cartridge. The CEW 1 may determine the cartridge type responsive to detecting the indicator magnet 505, the one or more additional magnets 510, a CEW operation (e.g., a safety switch being disabled or enabled, operation of a user interface, a motion detected by a motion detector, etc.), and/or the like. The CEW 1 may determine the cartridge type based on the detected indicator magnet 505, the detected one or more additional magnets 510, physical properties of the magazine, and/or the like.

In some embodiments, the CEW 1 locally stores information describing a set of additional magnets 510 having respective positions and respective polarities corresponding to one or more cartridge types. The locally stored information may also describe properties of the indicator magnet, physical properties of one or more magazines, and/or the like corresponding to one or more cartridge types. In some embodiments, the locally stored information may be stored in a data store (e.g., memory unit) of the CEW 1. The data store of the CEW may comprise a mapping of information about the one or more magnetic elements and a corresponding magazine type.

In other embodiments, the CEW 1 may establish a communication connection with a remote entity, e.g., a vehicle system, a client device, a body-worn camera, or a cloud or other server, and may access or receive information describing sets of additional magnets 510 having respective positions and respective polarities corresponding to one or more cartridge types. The remote entity may also store information describing properties of the indicator magnet, physical properties of one or more magazines, and/or the like corresponding to one or more cartridge types. In some embodiments, the remote entity may store the information in a data store (e.g., memory unit). The data store of the remote entity may comprise a mapping of information about the one or more magnetic elements and a corresponding magazine type.

Based on the cartridge type of the magazine 12, the CEW 1 may perform one or more actions, such as one or more of: modifying one or more settings of the CEW (e.g., a number of expected consecutive deployments of electrodes E prior to reloading a new cartridge); modifying information on a display or control interface of the CEW (e.g., displaying a cartridge type on a user display); and/or the like.

In embodiments of FIG. 6, the method may be performed by a CEW 1. In other embodiments, the method may be performed in part or in whole by other entities. Further, in other embodiments, the method may comprise additional or fewer steps, and the steps may be performed in a different order than described in conjunction with FIG. 6.

In some embodiments according to various aspects of the present disclosure, a holster of a conducted electrical weapon (CEW) comprises a set of magnetic elements. The set of magnetic elements may have positions, polarities, and magnitudes corresponding to a type of magazine. The CEW 1 uses sensors to detect at least one of the set of magnetic elements, such as an indicator magnet, indicating that the CEW 1 is inserted into the holster. In some embodiments, based on the detected information, the CEW 1 detects when the CEW 1 is removed from the holster, e.g., by a user. In some embodiments, based on the detected information, the CEW 1 may instead or additionally detect a type of the holster or other information describing the holster, such as validation information for the holster. Removal of a CEW 1 from a holster, validation information, and the like can determine a number of factors relevant to operation of the CEW 1. For example, the CEW 1 may broadcast information about the CEW 1 being removed from the holster to one or more other entities. In another example, the CEW 1 may identify an unauthorized user based on validation information received from a holster.

Figure 7A:
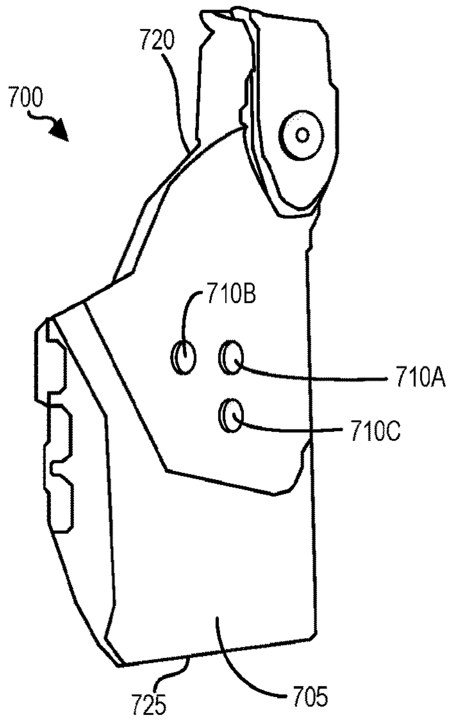
FIG. 7A is a perspective view of a holster for a CEW, in accordance with various embodiments.

FIG. 7A is a perspective view of a holster for a CEW 1, in accordance with various embodiments. In the example embodiment of FIG. 7A, the holster 700 comprises a housing 705 and a set of magnetic elements 710. Housing 705 may be sized and shaped to receive a barrel of a CEW 1. Housing 705 may comprise a cavity configured to receive CEW 1. Housing 705 may at least partially receive housing 10 of CEW 1 with brief reference to FIG. 1 Housing 705 may comprise, for example, a first end 720 having an opening sized and shaped to receive a barrel of a CEW 1 and a second end 725 being closed to maintain the barrel of the CEW 1 within the housing once inserted. First end 720 of housing 705 may be opposite second end 725 of housing 705. Housing 705 may additionally comprise one or more fastening mechanisms for securing CEW 1 within the housing once inserted. Housing 705 may additionally be sized and shaped to interface with a belt or other item of clothing of a user, e.g., may comprise one or more mechanisms for interfacing with the belt or other item of clothing, such as a clasp, clip, buckle, or any other suitable mechanism. Inserting CEW 1 in holster 700 may comprise inserting housing 10 of CEW 1 within housing 705 of holster 700. Removing CEW 1 from holster 700 may comprise removing housing 10 of CEW 1 from housing 705 of holster 700.

In embodiments, a magnetic element may comprise a polarity. A magnetic element may comprise a magnet. The polarity may be determined in accordance with a magnetic field of the magnet. The polarity may comprise a polarity as detected by a sensor of a CEW. For example, a magnetic element may have a positive polarity as detected by a sensor of sensors 42 of CEW 1. The polarity may be determined in accordance with a manner in which the magnetic element is oriented toward a sensor of the CEW upon insertion of the CEW in a holster. For example, a magnetic element may have two magnetic poles. The magnetic poles may include a north or positive pole and a south or negative pole. The polarity of the magnetic element may be determined in accordance with which pole of the two magnetic poles is directed toward a cavity of a holster in which a CEW may be inserted. For example, the magnetic element may have a first polarity when a positive pole is closest to the cavity of a holster. The magnetic element may have a first polarity when the positive pole is oriented toward the cavity of the holster. The magnetic element may comprise a different polarity in accordance with being integrated in the holster in a different relative orientation. For example, the magnetic element may have a second polarity when the negative pole is closest to the cavity of a holster. The magnetic element may have the second polarity when the negative pole is oriented toward the cavity of the holster. Accordingly, different magnetic elements may have different polarities in accordance with different poles of the magnetic elements being respectively oriented toward the cavity of the holster. In embodiments, a magnetic element may be integrated with a holster with a fixed orientation such that the polarity of the magnetic does not change over time.

Set of magnetic elements 710 may comprise a first magnetic element 710A, wherein the first magnetic element is an indicator magnet. The indicator magnet 710A is a magnetic element in the holster 700 that indicates to a processing unit of CEW 1 that the CEW has been inserted into the holster 700 and/or is within proximity of the holster. In some embodiments, indicator magnet 710A may have fixed properties across one or more holsters or holster types, such as a fixed position on the holster 700, a fixed polarity, and/or a fixed magnitude, so as to be readily identifiable by CEW 1. In other embodiments, indicator magnet 710A may vary in position, polarity, and/or magnitude across one or more holsters or holster types.

Set of magnetic elements 710 may additionally comprise one or more additional magnetic elements (e.g., magnetic element 710B, magnetic element 710C) having differing positions, polarities, and/or magnitudes across one or more holsters or holster types, such that each holster or holster type corresponds to a unique set of properties of the set of magnetic elements. For example, a first holster or holster type may have an indicator magnet 710A having a fixed position, polarity, and magnitude, and additional magnetic elements 710B-C having a set of properties A and B, while a second holster or holster type may have an indicator magnet 710A having the same fixed position, polarity, and magnitude, and additional magnetic elements 710B-C having sets of properties B and C.

As shown in the embodiment of FIG. 7A, the holster 700 comprises a total of three magnetic elements and the set of magnetic elements is disposed on an exterior surface of the housing 705. In other embodiments, holster 700 may comprise additional magnetic elements, fewer magnetic elements, and magnetic elements in positions different than those illustrated in FIG. 7A. In other embodiments, set of magnetic elements 710 are held within the holster 700 by one or more mechanical components. In other embodiments, set of magnetic elements 710 are disposed on an interior surface of the housing 705. In some embodiments, set of magnetic elements 710 may instead or additionally be held on an interior or exterior surface of housing 705 or within holster using other means, such as being magnetically fixed within the holster, fixed using an adhesive, or the like.

In various embodiments, set of magnetic elements 710 may be located in any suitable position within or on holster 700. For example, the set of magnetic elements 710 may be located in a position capable of enabling the set of magnetic elements to interface with components of the CEW handle capable of determining the physical properties of the set of magnetic elements. Set of magnetic elements 710 may be disposed in a two-dimensional pattern along a common surface of housing 705. For example, third magnetic element 710C may be disposed between second end 725 and first magnetic element 710A, while second magnetic element 710B may be disposed in a lateral direction from first magnetic element 710A between first end 720 and second end 725. Although depicted in FIG. 7A as being disposed together, it should be understood that one or more of the set of magnetic elements 710 may positioned separately. For example, a first magnetic element of the set of magnetic elements 710 may be positioned at a first end 720 of the holster and one or more additional magnetic elements may be positioned at a second end 725 of the holster. In another example, although depicted in FIG. 7A as the set of magnetic elements being disposed on a side of the housing 705, it should be understood that the set of magnetic elements may be disposed in a different location on or within the holster.

Each magnetic element of the set of magnetic elements 710 may have a respective position. The respective position may comprise a respective position on a side of housing 705. Respective positions of different magnetic elements of the set of magnetic elements 710 may comprise different respective positions on a same or different side of housing 705. Each respective position among one or more respective positions for one or more magnetic elements of the set of magnetic elements may be associated with at least one sensor of one or more sensors of sensors 42 of CEW 1. Each respective position of the one or more magnetic elements of the set of magnetic elements may be associated with a respective position on housing 10 of CEW 1 at which at least one sensor of sensors 42 is integrated. For example, each respective position may be configured to be detected by at least one sensor of sensors 42 when CEW 1 is fully inserted in housing 705. The at least one sensor may comprise a same or different respective sensors of sensors 42 for each pair of two or more sensors of sensors. Alternately or additionally, each respective position may be configured to be detected by at least one sensor of sensors 42 when CEW 1 is partially inserted in housing 705. For example, a respective position of a magnetic element may correspond to a position along housing 705 at which a sensor of CEW 1 will slide past or otherwise translate along as CEW 1 is being inserted into holster 700 or removed from holster 705. A relative position between CEW 1 and housing 705 may be different when CEW 1 is fully inserted in housing 705 and when CEW 1 is partially inserted in housing 705. Accordingly, as detected by one or more sensors, the respective positions of magnetic elements 710 may enable different relative positions between CEW 1 and holster 700 to be identified.

Figure 7B:
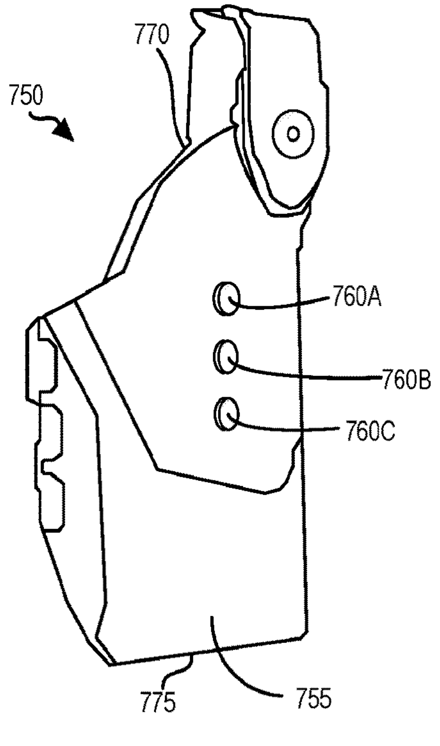
FIG. 7B is a perspective view of a holster for a CEW, in accordance with various embodiments.

FIG. 7B is an alternate perspective view of a holster for a CEW 1, in accordance with various embodiments. FIG. 7B illustrates an example embodiment of a holster 750 similar to the holster 700 of FIG. 7A having a set of magnetic elements 760 and a housing 755. Set of magnets 760 may be disposed in series on an exterior surface of housing 755. Housing 755 may be sized and shaped to receive a barrel of a CEW 1. Housing 755 may comprise a cavity configured to receive housing 10 of CEW 1. Housing 755 may at least partially receive housing 10 of CEW 1 with brief reference to FIG. 1. Housing 755 may comprise, for example, a first end 770 having an opening sized and shaped to receive a barrel of a CEW 1 and a second end 775 being closed to maintain the barrel of the CEW 1 within the housing once inserted. First end 770 of housing 755 may be opposite second end 775 of housing 770. Housing 755 may additionally be sized and shaped to interface with a belt or other item of clothing of a user, e.g., may comprise one or more mechanisms for interfacing with the belt or other item of clothing, such as a clasp, clip, buckle, or any other suitable mechanism. Inserting CEW 1 in holster 750 may comprise insertion of housing 10 of CEW 1 within housing 755 of holster 750. Removing CEW 1 from holster 750 may comprise removal of housing 10 of CEW 1 from housing 755 of holster 750.

A magnetic element of set of magnetic elements 760 may comprise a characteristic and/or perform a function of a magnetic element of set of magnetic elements 710. For example, set of magnetic elements 760 may comprise a first magnetic element 760A. First magnetic element 760 may comprise an indicator magnet. The indicator magnet 760A is a magnetic element in the holster 755 that indicates to a processing unit of CEW 1 that the CEW has been inserted into the holster 755 and/or is proximate holster 755. In some embodiments, indicator magnet 760A may have fixed properties across one or more holsters or holster types, such as a fixed position on the holster, a fixed polarity, and/or a fixed magnitude, so as to be readily identifiable by CEW 1. In other embodiments, indicator magnet 760A may vary in position, polarity, and/or magnitude across one or more holsters or holster types.

Set of magnetic elements 760 may additionally comprise one or more additional magnetic elements (e.g., magnetic element 760B, magnetic element 760C). The additional magnetic elements may have different positions, polarities, and magnitudes across one or more holsters or holster types, such that each holster or holster type corresponds to a unique set of properties of the set of magnetic elements. For example, a first holster or holster type may have an indicator magnet 760A having a fixed position, polarity, and magnitude, and additional magnetic elements 760B-C having a set of properties A and B, while a second holster or holster type may have an indicator magnet 760A having the same fixed position, polarity, and magnitude, and additional magnetic elements 760B-C having sets of properties B and C.

As shown in the embodiment of FIG. 7B, the holster 750 comprises a total of three magnetic elements and the set of magnetic elements is disposed in a series on an exterior surface of the housing 755. First magnetic element 760A, second magnetic element 760B, and third magnetic element 760C may be disposed in a linear direction along housing 705 between first end 770 and second end 755. In other embodiments, holster 750 may comprise additional magnetic elements, fewer magnetic elements, and magnetic elements in positions different than those illustrated in FIG. 7B. In other embodiments, set of magnetic elements 760 are held within the holster 750 by one or more mechanical components. In other embodiments, set of magnetic elements 760 are disposed on an interior surface of the housing 755. In some embodiments, set of magnetic elements 760 may instead or additionally be held on an interior or exterior surface of housing 755 or within holster using other means, such as being magnetically fixed within the holster, fixed using an adhesive, or the like.

In the example embodiment of FIG. 7B, set of magnetic elements 760 are disposed in a series, comprising first magnetic element 760A being proximate to an open, first end 770 of housing 755 and third magnetic element 760C being proximate to a closed, second end 755 of housing 755. When a CEW 1 is inserted in the holster 750 as described in conjunction with FIG. 7A, each magnetic element of the set of magnetic elements 760 comprises a respective polarity and magnitude. Respective positions of magnetic elements 760 enables CEW 1 to detect, during removal of CEW 1 from holster 750 or insertion of CEW into holster, change in magnitude of respective magnetic elements at differing rates and/or times. The magnitude and/or polarity of an individual magnetic element may, in some embodiments, be detected by a same sensor of CEW 1. For example, during removal of CEW 1 from holster 750, CEW 1 is withdrawn past position of third magnetic element 760C at an earlier time than position of first magnetic element 760A, causing magnitude of third magnetic element 760C as detected by CEW 1 to decrease prior to magnitude of first magnetic element 760A decreasing. In some embodiments, a magnitude of third magnetic element 760C may decrease prior to an increase and decrease of a magnitude of first magnetic element 760A detected by a same sensor of CEW 1 as the same sensor translates past third and first magnetic elements 760C,A while CEW 1 is removed from housing 755. In another example, a detected magnitude of third magnetic element 760C may decrease at a faster rate than magnitude of first magnetic element 760A. In another example, during insertion of CEW 1 into holster 750, CEW 1 is inserted past position of first magnetic element 760A at an earlier time than position of third magnetic element 760C, causing magnitude of first magnetic element 760A, as detected by CEW 1, to increase and/or be detected prior to a magnitude of third magnetic element 760C increasing and/or being detected. In some embodiments, a magnitude of first magnetic element 760A may increase and decrease, as detected by a same sensor of CEW 1, prior to an increase and decrease of a magnitude of third magnetic element 760C being detected by a same sensor of CEW 1 as the same sensor translates past first and third magnetic elements 760A,C while CEW 1 is inserted into housing 705. In another example, magnitude of first magnetic element 760A may increase at a faster rate than magnitude of third magnetic element 760C. Based on detection times, rates of change, and the like of each magnetic element in set of magnetic elements 760, CEW 1 may detect whether CEW 1 is being inserted into or removed from holster 750. Alternately or additionally, based on detection times, rates of change, and the like of each magnetic element in the set of magnetic elements 760, CEW 1 may additionally detect when CEW 1 is in proximity to holster 750, direction of movement relative to holster 750, or the like.

In other embodiments, set of magnetic elements 760 may be positioned differently than illustrated in FIG. 7B. For example, first magnetic element 760A may be positioned closer to open end of housing 755 and third magnetic element 760C may be positioned closer to closed end of housing 755, such that changes in magnitude of respective magnetic elements may be more apparent to CEW 1.

In some embodiments, properties of set of magnetic elements 760 may additionally be used to determine information about a holster. A set and/or sequence of detected polarities may enable information about the holster to be determined. For example, first magnetic element 760A may comprise a first polarity and third magnetic element 760C may comprise second polarity different from the first polarity. The first polarity may comprise a positive polarity and the second polarity may comprise a negative polarity. Accordingly, detecting information about holster 750 comprising CEW 1 is being inserted in housing 755 may comprise detecting the first polarity and then the second polarity of the first and third magnetic elements 760A,C. Alternately or additionally, detecting information about holster 750 comprising CEW 1 is being removed from 755 may comprise detecting the second polarity and then the first polarity of the third and first magnetic elements 760 C,A. Alternately or additionally, the set of magnetic elements 760 may comprise differing magnitudes, such that detection of a sequence of the differing magnitudes detected by a sensor or sensors of CEW 1 may indicate information about holster 750 comprising CEW 1 is inserted or removed from housing 755. Alternately or additionally, different combinations of magnitudes, polarities, and or positions may be used, in accordance with a mapping of information, to determine a corresponding type of magazine or other information describing the holster.

Figure 8:
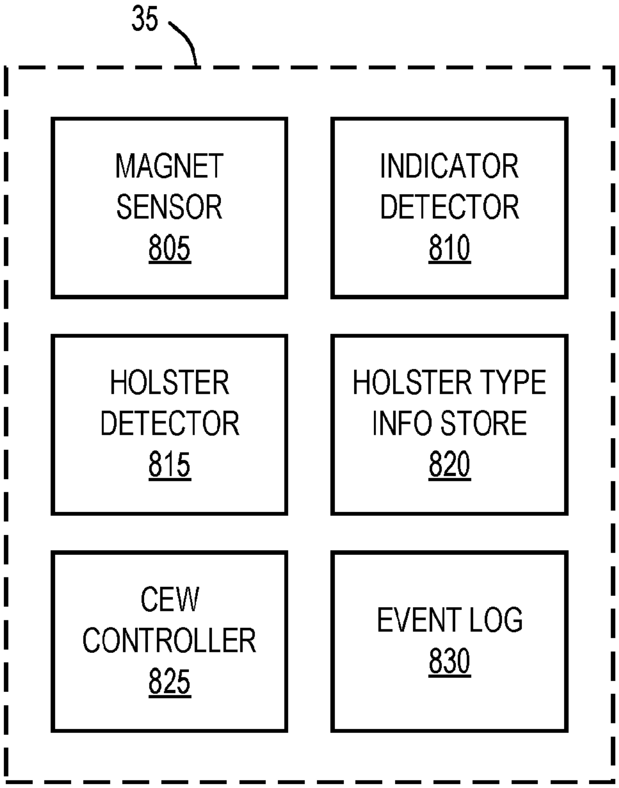
FIG. 8 is a block diagram illustrating an example processing unit for a CEW, in accordance with various embodiments.

FIG. 8 is a block diagram illustrating an example processing unit for a CEW, in accordance with various embodiments. In the embodiment of FIG. 8, the example processing circuit 35 comprises magnet sensor 805, indicator detector 810, holster detector 815, holster type info store 820, CEW controller 825, and event log 830. In other embodiments, the processing circuit may comprise additional, fewer, or different modules, and modules may perform differently than described herein. In embodiments, the example processing unit may perform one or more operations responsive to detecting a magnetic element integrated with a hostler. For example, the example processing unit may perform one or more operations responsive to detecting a magnetic element of magnetic elements 710 or 760 integrated with hostler 700 or 750 with brief reference to FIG. 7A-B.

The magnet sensor 805 comprises one or more sensors configured to detect magnetic elements in holsters responsive to a CEW being inserted into the holster. In embodiments, holster sensor 805 may perform a function or functions of one or more sensors of sensors 42 with brief reference to FIG. 1. In some embodiments, the one or more sensors detect one or more physical properties of the holster. For example, in some embodiments, the one or more sensors are Hall effect sensors. In other embodiments, the one or more sensors may be magneto-resistive, magneto-diode, magneto-transistor, or other types of magnetometers configured to detect magnetic elements in holsters. In other embodiments, the one or more sensors may additionally or instead detect other physical properties of the holster, such as, for example, one or more of: Indica printed on surfaces of holsters, physical indents, extrusions, other markings on holsters, or the like.

In some embodiments, the magnet sensor 805 is configured to, responsive to detecting one or more magnetic fields or other physical properties, capture and transmit information about the one or more detected magnetic fields or other physical properties to the indicator detector 810. Information about the one or more detected magnetic fields may comprise, for example, a position of a magnetic element causing the detected magnetic field; a polarity of the magnetic field; a magnitude of the magnetic field; and the like.

The indicator detector 810 receives information about one or more detected magnetic fields from the magnet sensor 805 and determines whether a detected magnetic field of the one or more detected magnetic fields corresponds to an indicator magnet. An indicator magnet (e.g., a first magnet) is a magnetic element in a holster 700 that indicates to a processing circuit of a CEW 1 that CEW has been inserted into a holster. In some embodiments, the indicator magnet may have a fixed polarity. In some embodiments, the indicator magnet may have a fixed position on a holster, such as holster 700 or 750. In some embodiments, the indicator magnet may have a fixed magnitude. In other embodiments, the indicator magnet may have one of a set of fixed positions, magnitudes, and/or polarities, e.g., such that a magnetic field detected within a set of positions, magnitudes, and/or polarities indicate to the processing unit of the CEW 1 that the CEW has been inserted into a holster.

In some embodiments, the holster detector 815 performs a check for one or more additional magnetic elements (e.g., a second magnet, a third magnet, a fourth magnet, etc.) responsive to the indicator detector 810 detecting an indicator magnet. The holster detector 815 determines, based on one or more additional magnetic elements, information about the holster. For example, the holster detector 815 determines a holster type of the holster 700 housing the CEW 1. In other embodiments wherein the holster does not comprise an indicator magnet, the holster detector 815 performs a check for the set of magnetic elements 710 responsive to the indicator detector 810 detecting a magnetic element of the set of magnetic elements, e.g., a magnetic element that is not an indicator element. In other embodiments wherein the magazine does not comprise an indicator magnet, the holster detector 815 performs a check for one or more magnetic elements responsive to other stimuli, e.g., a CEW experiencing sudden movement or acceleration, an action by a user of the CEW, an instruction received by a remote entity to perform the check, and the like.

In some embodiments, the holster detector 815 additionally performs checks for sets of magnetic elements at periodic intervals (e.g., 1 second, 3 seconds, 5 seconds, 10 seconds, 1 minute, etc.) responsive to a CEW 1 being inserted into a holster 700. Responsive to the set of magnetic elements no longer being detected, the holster detector 815 determines that the CEW 1 is removed from the holster 700, e.g., by a user for purposes of deployment. In other embodiments, the holster detector 815 receives data from the magnet sensor 805 in real-time responsive to the CEW 1 being inserted into a holster 700, such that the holster detector 815 may determine in real-time when the CEW is removed from the holster responsive to no longer detecting the set of magnetic elements and/or detecting a change in the set of magnetic elements.

In some embodiments, the holster detector 815 receives information describing one or more detected magnetic fields and accesses the holster type info store 820 to determine a holster type corresponding to the received information describing the one or more detected magnetic fields. The information describing the one or more magnetic fields may comprise a set of respective positions, polarities, and/or magnitudes corresponding to a set of magnetic elements. In some embodiments, e.g., in embodiments wherein the indicator magnet has a fixed position, polarity, and magnitude, the information describing the one or more magnetic fields may exclude information describing an indicator magnet. In other embodiments, the received information may comprise other information about physical properties of the holster 700, such as information describing indicia printed on a surface of the holster, indents, extrusions, other markings on the holster, and the like.

The holster type info store 820 stores and maintains information describing holster types, holster validation information, and/or magnetic elements or other physical properties corresponding to the holsters or holster types. For example, in some embodiments, holsters comprise three magnetic elements. The three magnetic elements may comprise one indicator magnet and two additional magnetic elements, or may comprise three magnetic elements without an indicator magnet. In other embodiments, holsters comprise fewer or more magnetic elements. Each holster of a holster type comprises a fixed set of positions, polarities, and/or magnitudes for each of the magnetic elements. The holster type info store 820 maintains information describing each fixed set of positions, polarities, and/or magnitudes for known holster types. As such, based on the information describing the one or more detected magnetic fields and information stored by the holster type info store 820, the holster type detector 815 identifies a holster type having magnetic elements corresponding to the information.

In some embodiments, the holster type info store 820 additionally stores and maintains information describing holster validation. For example, one or more holsters or holster types may be associated with authenticated users, authenticated entities (e.g., police departments), or the like. Holster validation may be associated with one or more permissions for the CEW 1, e.g., such that authenticated users or authenticated entities may be associated with permissions to deploy CEW 1 or utilize one or more accessory components of CEW 1. In another example, one or more holsters or holster types may be associated with use for the type of CEW 1. As such, the holster type info store 820 may identify one or more holster types as validated for use, or may identify one or more holsters as being owned by authenticated users or entities. In other examples, one or more holsters or holster types may comprise other physical properties associated with authentication or validation information, e.g., validation numbers printed as indicia on surfaces of the holsters.

In some embodiments, the holster type info store 820 may additionally store and maintain information describing one or more additional properties of holster types.

In the embodiment of FIG. 8, the holster type info store 820 may be partially or wholly stored locally by CEW 1. In other embodiments, the holster type info store 820 may be partially or wholly stored by a remote entity, e.g., a vehicle system, client device, dispatch system, or the like, and may provide information to CEW 1 via a communications interface.

The CEW controller 825 performs one or more actions responsive information describing a holster. In some embodiments, the CEW controller 825 may modify one or more settings or parameters of the CEW 1. For example, CEW controller 825 may such as enabling one or more settings or functions responsive to detection of an authenticated or validated holster. For example, CEW controller 825 may enable one or more accessory components of CEW 1, such as a flashlight, aiming laser, audio output component, and/or the like responsive to detection of an authenticated or validated holster. In another example, CEW controller 825 may enable deployment of CEW 1 responsive to detection of an authenticated or validated holster. In some embodiments, CEW 1 may disable one or more settings or functions responsive to detection of an unauthenticated or unvalidated holster, e.g., CEW controller 825 may disable one or more accessory components of CEW 1 or disable deployment of CEW 1. In another example, CEW controller 825 may initiate a safety mode responsive to detection of an unauthenticated or unvalidated holster.

In some embodiments, the CEW controller 825, responsive to receiving information from the holster detector 815 that the CEW 1 is removed from the holster 700, transmits a notification via a communications interface that the CEW is removed. For example, the CEW controller 825 transmits a notification via BLUETOOTH or other short range wireless communications interface to notify other entities or users within an area that the CEW 1 is removed from the holster 700, e.g., so that it may be deployed. In another example, the CEW controller 825 transmits a notification via BLUETOOTH or another communications interface to notify other entities or users within an area responsive to any change in status of the CEW 1, e.g., responsive to being inserted into a holster, responsive to being removed from a holster, and the like. In other embodiments, the CEW controller 825 may establish a communications channel with one or more entities to transmit notifications.

In various embodiments, CEW controller 825 stores information describing events or event types in event log 830. An event may comprise a predetermined operation of a CEW detected by CEW controller 825. For example, an events may comprise one or more of insertion of CEW 1 in a holster, removal of CEW 1 from the holster, disabling a safety of control interface 17 of CEW 1, activation of trigger 15 of CEW 1, deployment of one or more electrodes E from CEW 1, a proximity or non-proximity of CEW 1 to holster, and/or enabling the safety of control interface 17 of CEW 1. Information regarding a same event may be stored as a log entry in event log 830. The information stored in event log 830 may enable a manner in which CEW 1 is employed over a period of time to be reconstructed or otherwise identified at a subsequent point in time. In the example embodiment of FIG. 8, event log 830 may be a local data store or log of CEW 1. In other embodiments, event log 830 may be remotely hosted, e.g., by an entity or system communicatively coupled to CEW 1, a cloud-hosted data store, or the like, such that CEW controller 825 transmits information to remotely hosted event log 830 to be stored via a communications interface as previously described.

CEW controller 825 may transmit, store, and organize information describing one or more events in event log 830. Information may include an event identifier, event type, a time and/or date corresponding to an event, a user ID corresponding to a user of CEW at the time of event, sensor information corresponding to an event, or the like. In some embodiments, event log 830 may additionally receive and store image or video data captured by one or more camera devices communicatively coupled to CEW 1, commands or information (e.g., voice commands, button presses, or the like) input by users of CEW 1 or users of one or more devices communicatively coupled to CEW 1, or other sensor data captured by one or more sensors communicatively coupled to CEW 1. In some embodiments, event log 830 may additionally receive and store information describing electrodes E of CEW 1 being deployed and/or stimulus signal being provided by CEW 1. For example, and responsive to detection of one or more magnetic elements via sensor 805, CEW controller 825 may store information regarding a holstering event in event log 830 describing CEW 1 being inserted into holster at a first time. Alternately or additionally, and responsive to detection of one or more magnetic elements via sensor 805, CEW controller 825 may additionally store information regarding an unholstering event in event log 830 describing CEW 1 being removed from holster at a second time different from the first time. In some embodiments, CEW controller 825 may additionally and/or separately store information in event log 830 describing CEW 1 being deployed.

In the embodiment of FIG. 8, event log 830 is partially or wholly stored locally by CEW 1. In other embodiments, event log may be partially or wholly stored by a remote entity, e.g., a vehicle system, client device, dispatch system, or the like. In some embodiments, CEW controller 825 may transmit information describing events to be stored in remote event log via a communications interface. CEW controller 825 may transmit information periodically, e.g., every 10 minutes, every 1 minute, or in real-time.

In various embodiments, CEW controller 825 generates an alert responsive to determining information about the holster 700. CEW controller 825 may generate, for example, a haptic alert, a visual alert, and/or an audio alert. For example, CEW controller 825 determines that CEW 1 is removed from holster 700 and, responsive to the determining, generates a haptic alert by a haptic feedback device. In another example, CEW controller 825 determines that CEW 1 is inserted into an unauthenticated or unvalidated holster and generates a visual and/or audio alert. In other examples, CEW controller 825 may generate one or more alerts responsive to one or more other events or event types.

Figure 9:
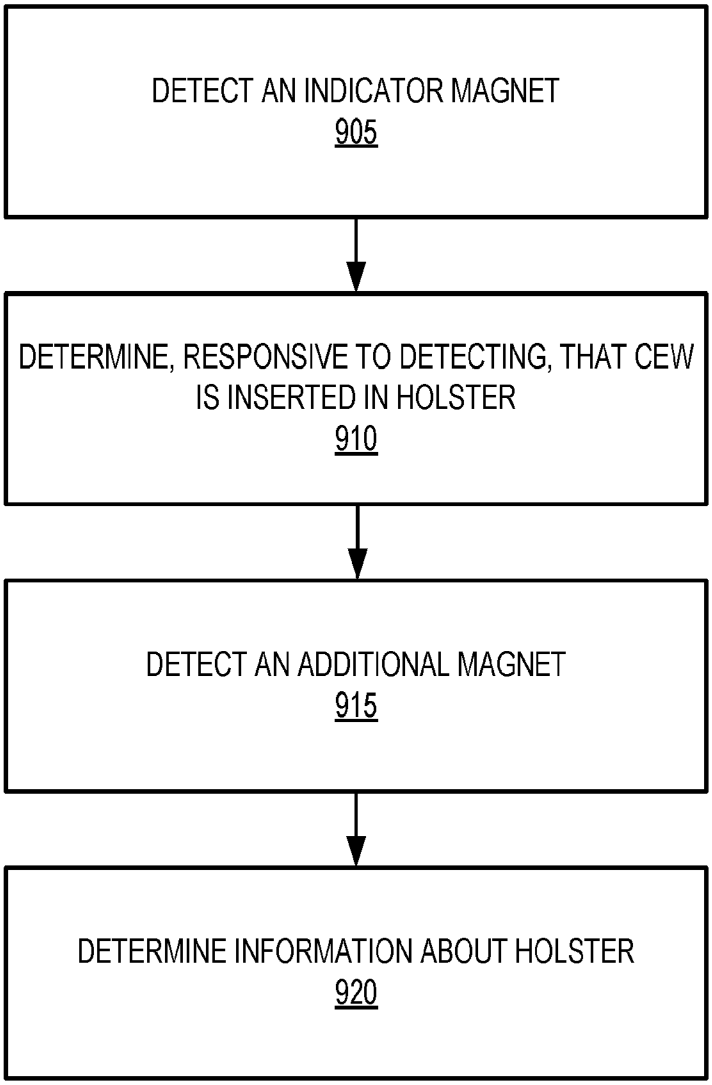
FIG. 9 is a flow chart illustrating a method for detecting information about a holster by a CEW, in accordance with various embodiments.

FIG. 9 is a flow chart illustrating a method for detecting information about a holster by a CEW, in accordance with various embodiments. For example, and in accordance with various embodiments, the method may include one or more steps for detecting magnetic elements in holsters and determining information about the holster in accordance with detecting the magnetic elements. The information about the holster may comprise holster types or authenticated holsters based on the magnetic elements by a CEW. Alternately or additionally, the information about the holster may comprise status information indicating that the CEW is inserted into or removed from a holster based on magnetic elements in holsters. The status information indicating that the CEW is inserted into or removed from the holster may identify that the CEW is inserted or removed relative to the holster as detected by the CEW itself.

In embodiments, a holster comprises housing for receiving a CEW. The CEW comprises one or more electrical components, comprising at least a processing circuit and one or more sensors for detecting magnetic elements and/or other physical properties of holsters receiving the CEW. The holster receives a CEW into a housing of the holster. For example, and with brief reference to FIGS. 1 and 8, CEW 1 and/or a CEW comprising processing circuit 35 may perform one or more steps of the example method shown in FIG. 9. The one or more steps may be performed in accordance with detecting one or more magnetic elements 710 and/or 760 integrated with housing 705 and/or 755 of holster 700 and/or 750 with brief reference to FIG. 7A-7B.

In embodiments, the CEW performs a check for one or more magnetic elements. One or more magnetic elements may each have a physical property. The physical property may comprise a respective position on the holster, a respective polarity, and/or the like. Performing the check may comprise detecting or not detecting the physical property. detecting or not detecting the physical property may comprise detecting or not detecting an amount of the property. For example, performing the check may comprise not detecting or detecting a magnitude and/or polarity of a magnetic element via a sensor. Performing the check may comprise detecting or not detecting the one or more magnetic elements in accordance with the physical property of the one or more magnets. For example, a magnetic element positioned at an end of a holster may be detected or not detected in accordance with a CEW being disposed in a housing of the holster proximate or not proximate the end of the holster. The check may be performed by the CEW by detecting the one or more magnets, detecting each physical property of the one or more magnets, and/or the like, in accordance with various embodiments. In embodiments, a check may comprise detecting, via at least one sensor, one or more magnets at a point in time. In some embodiments, performing the check may comprise sampling, by a processing circuit, information detected by the at least one sensor. In other embodiments, performing the check may comprise asynchronously receiving information from the least one sensor responsive to the at least one sensor being disposed proximate one or more magnets, the information indicating that one or magnets have or have not been detected.

For example, the CEW detects 905 an indicator magnet, e.g., a first magnet, of the holster. The indicator magnet may comprise a first magnet of the holster having a first position. In some embodiments, indicator magnet may comprise a first polarity. In some embodiments, the indicator magnet has a standard position and/or polarity across one or more holsters or holster types. Detecting 905 may comprise detecting a non-zero magnitude of the indicator magnet. Alternately or additionally, detecting 905 may comprise detecting the first polarity of the indicator magnet and/or detecting the indication via a sensor at predetermined position on a housing of the CEW.

Responsive to detecting the indicator magnet, the CEW detects 910 that the CEW is inserted in the holster. In some embodiments, the CEW may perform one or more actions responsive to detecting that the CEW is inserted in the holster, e.g., disabling one or more functions of the CEW, such as deployment or use of accessory functions. In other embodiments, the CEW begins to perform further checks for the indicator magnet or set of magnetic elements responsive to detecting the indicator magnet to identify when a change in status occurs. The further checks may be performed periodically, e.g., every 1, 3, 5, or 10 seconds, every 1 minute, or may be performed in real time, e.g., such that the CEW receives further information in real-time from one or more sensors.

The CEW detects 915 one or more additional magnets, e.g., a second magnet, a third magnet, etc. The CEW may detect the one or more additional magnets together with detecting the indicator magnet. The CEW may detect the one or more additional magnets responsive to detecting the indicator magnet. The one or more additional magnets may have one or more respective positions on the cartridge and one or more respective polarities. The one or more respective positions may be a set of standard positions on a cartridge, and the one or more respective polarities may be positive, negative, or neutral, and may vary in magnitude. While illustrated as separate steps in the example of FIG. 9, performing a check may comprise detecting an indicator magnet 905 and/or detecting at least one additional magnet 915 according to various aspects of the present disclosure.

The CEW determines 920 information about the holster. In various embodiments, the CEW determines a holster type of the holster. The CEW may determine the holster type based on the detected indicator magnet, the detected one or more additional magnets, physical properties of the holster such as indicia printed on a surface of the holster, and/or the like.

In some embodiments, the CEW locally stores information describing a set of magnetic elements having respective positions and respective polarities corresponding to one or more holster types. Determining 920 the information about the holster may comprise storing the information. The locally stored information may also describe properties of the indicator magnet, physical properties of one or more magazines, validation or authentication information associated with the holster types, and/or the like corresponding to one or more holsters and/or holster types. In some embodiments, the locally stored information may be stored in a data store (e.g., memory unit) of the CEW. The data store of the CEW may comprise a mapping of information about the one or more magnetic elements and a corresponding holster or holster type. Determining 920 information may comprise determining the information in accordance with the stored information describing the set of magnetic elements.

In other embodiments, the CEW may establish a communication connection with a remote entity. Determining 920 the information about the holster may comprise establishing the communication connection. The remote entity may be physically separate from the CEW. The remote entity may be in communication with the CEW via one or more communication networks. The remote entity may comprise, for example, a vehicle system, a client device, a body-worn camera, or a cloud or other server. The CEW may further access or receive information describing sets of magnetic elements having respective positions and respective polarities corresponding to one or more holster types. The remote entity may also store information describing properties of the indicator magnet, physical properties of one or more holsters, and/or the like corresponding to one or more holster types. In some embodiments, the remote entity may store the information in a data store (e.g., memory unit). The data store of the remote entity may comprise a mapping of information about the one or more magnetic elements and a corresponding holster and/or holster type.

In some embodiments, the CEW may additionally or instead receive information (locally or via a remote communications connection) identifying a holster or holster type as being validated or authenticated for use by the CEW or a user of the CEW. Determining 920 the information about the holster may comprise receiving the information. As discussed, the set of magnetic elements may additionally or instead correspond to authentication or validation information, e.g., may represent a code or a number identifying a holster as being authenticated for use in association with the CEW, may represent an entity such as a police force or department, or the like.

In some embodiments, based on the holster type of the holster and/or the validation information, the CEW may perform one or more actions. Determining 920 the information about the holster may comprise performing the one or more action. The action may comprise modifying one or more settings of the CEW, e.g., enabling or disabling one or more functions of the CEW, including deploying, accessing accessories such as flashlights, and the like. In some embodiments, based on information about the holster comprising the CEW being inserted into or removed from a holster, the CEW may transmit one or more notifications to one or more other entities within an area, e.g., transmitting a BLUETOOTH notification to one or more other entities responsive to the CEW being removed from the holster.

In various embodiments, the CEW 1 determines when a change to a status of the CEW occurs. Determining 920 the information about the holster may comprise determining when the change to the status occurs. In some embodiments, CEW 1 begins to perform further checks for the indicator magnet or set of magnetic elements responsive to detecting the indicator magnet to identify when a change in status occurs. Performing the further checks may comprise repeating steps 905 and/or 915 with brief reference to FIG. 9. The further checks may be performed periodically, e.g., every 1, 3, 5, or 10 seconds, or every 1 minute, or may comprise the CEW receiving further information in real-time from one or more sensors. Responsive to a further check failing to detect the indicator magnet or set of magnetic elements, CEW determines that the CEW is not inserted in the holster of the CEW. In various embodiments, CEW may additionally or alternately determine that CEW is being removed from or inserted into the holster responsive to one or more changes in magnitude or detected positions of the set of magnetic elements, as described in conjunction with FIG. 7B.

In various embodiments, the CEW logs or stores the determined information about the holster. For example, CEW transmits one or more notifications to one or more other entities within an area, e.g., a BLUETOOTH notification, responsive to CEW being removed from holster. In another example, CEW additionally or instead stores a log of determined information about the holster. For example, CEW may store a first log entry having a first timestamp comprising the CEW being inserted in the holster and/or a second log entry having a second timestamp comprising the CEW being removed from the holster. CEW may store the log of determined information about the holster locally or remotely, and log of determined information may be stored separately or in conjunction with other information, such as log entries of CEW being deployed, image or video data being captured by camera devices communicatively coupled to CEW, other sensor data captured by CEW or devices communicatively coupled to CEW, user input information, or the like.

In various embodiments, the CEW outputs an alert responsive to the determined information about the holster. In some embodiments, the alert may be a haptic alert. In other embodiments, the alert may be a visual or audio alert. For example, CEW outputs a haptic alert responsive to CEW determining that CEW is removed from the holster. In another example, CEW outputs a visual and/or audio alert responsive to CEW being inserted into a holster or holster type that is not validated for use with the CEW. In some embodiments, CEW may output an alert in conjunction with transmitting one or more notifications to one or more entities within an area. In some embodiments, CEW may additionally or instead output an alert in conjunction with performing one or more actions, such as disabling one or more functions of CEW.

In embodiments, determining information about the holster may comprise one or more operations of determining 910 and/or determining 920 with brief reference to FIG. 9. The information about the holster may be determined in accordance with information detected by the CEW. For example, the CEW may detect information responsive to performing a check. The detected information may be subsequently processed to determine the information about the holster.

In some embodiments, determining information about a holster may comprise determining status information about the holster. The status information may indicate a position of a holster relative to a CEW. For example, the status information about the holster may comprise the holster is proximate or not proximate the CEW. In some embodiments, status information indicating that holster is proximate or not proximate the CEW may be determined in accordance with respectively or not detecting one or more magnetic elements. In some embodiments, the status information may comprise detecting the CEW is inserted in the holster or, alternately, the CEW is removed from the holster. In some embodiments, status information indicating that CEW is removed or inserted in a holster may be determined in accordance with a pattern and/or sequence of detecting or not detecting one or more magnetic elements of the holster. For example, determining status information about the holster may comprise determining 910 the CEW is inserted in the holster with brief reference to FIG. 1.

In some embodiments, determining information about a holster may comprise determining information describing the holster. Information describing a holster may comprise information describing a holster type, holster validation information, and/or another physical property. For example, determining information describing the holster may comprise determining 920 information about the holster comprising a holster type with brief reference to FIG. 9.

In embodiments of FIG. 9, the method may be performed by a CEW, such as CEW 1 with brief reference to FIG. 1. In other embodiments, the method may be performed in part or in whole by other entities. Further, in other embodiments, the method may comprise additional or fewer steps, and the steps may be performed in a different order than described in conjunction with FIG. 9.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus or system for performing the operations herein. Such an apparatus or system may be specially constructed for the required purpose, and/or it may comprise a general-purpose device selectively activated or reconfigured by a computer program stored in the apparatus or system. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

Examples of various exemplary embodiments embodying aspects of the invention are presented in the following example set. It will be appreciated that all the examples contained in this disclosure are given by way of explanation, and not of limitation.

What is claimed is:

1. A method comprising:

performing, by a conducted electrical weapon ("CEW"), a check for one or more magnetic elements, each magnetic element of the one or more magnetic elements having a respective position on a holster of the CEW and a respective polarity; and determining, by the CEW based at least in part on the check for the one or more magnetic elements, information about the holster.

2. The method of claim 1, further comprising:

detecting, by the CEW, an indicator magnet of the one or more magnetic elements, the indicator magnet having a first position on the holster of the CEW; and determining, responsive to detecting the indicator magnet, that the CEW is inserted in the holster of the CEW.

3. The method of claim 2, wherein the first position of the indicator magnet is a fixed position on the holster of the CEW.

4. The method of claim 2, wherein the indicator magnet comprises a first polarity, and wherein the first polarity of the indicator magnet is a fixed polarity.

5. The method of claim 1, wherein determining information about the holster comprises determining a holster type of the holster of the CEW based at least in part on the respective polarity of each of the one or more magnetic elements.

6. The method of claim 5, wherein determining the holster type of the holster of the CEW is based at least in part on the respective position of each magnetic element of the one or more magnetic elements.

7. The method of claim 5, wherein determining the holster type of the holster comprises accessing, by the CEW, a data store of the CEW, the data store of the CEW comprising a mapping of information about the one or more magnetic elements and a corresponding holster type.

8. The method of claim 5, wherein determining the holster type of the holster comprises establishing, by the CEW, a communication channel with a remote entity and receiving, from the remote entity, a mapping of information about the one or more magnetic elements and a corresponding holster type.

9. The method of claim 1, further comprising modifying, by the CEW, one or more parameters of operation of the CEW based at least in part on the determined information about the holster.

10. The method of claim 1, further comprising validating, by the CEW, use of the CEW based at least in part on the determined information about the holster.

11. The method of claim 1, further comprising:

determining, responsive to performing the check, that the CEW is inserted in the holster of the CEW; and transmitting, to one or more entities, a notification that the CEW is inserted in the holster of the CEW.

12. The method of claim 11, further comprising:

performing, by the CEW at a later time, a second check for the one or more magnetic elements; and determining, responsive to performing the second check, that the CEW is not inserted in the holster of the CEW; and transmitting, to the one or more entities, a second notification that the CEW has been removed from the holster of the CEW.

13. The method of claim 1, wherein a first magnetic element of the one or more magnetic elements comprises a first respective position at a first end of the holster and a second magnetic element of the one or more magnetic elements comprises a second respective position at a second end of the holster opposite the first end of the holster.

14. The method of claim 13, further comprising:

performing additional checks for the one or more magnetic elements at periodic time intervals;

determining, responsive to an additional check of the additional checks detecting at least one of the first magnetic element or the second magnetic element, a status of the CEW being removed from the holster; and transmitting, to one or more remote entities, a notification that the CEW is being removed from the holster.

15. A conducted electrical weapon ("CEW") comprising:

a housing configured to be inserted in a holster;

a sensor configured to at least in part perform a check for one or more magnetic elements; and a processor communicatively coupled to the sensor, wherein the processor is configured to perform steps comprising:

performing, via the sensor, the check for the one or more magnetic elements, the one or more magnetic elements integrated with the holster of the CEW at one or more respective positions and with one or more respective polarities; and determining, based at least in part on the check for the one or more magnetic elements, information about the holster.

16. The CEW of claim 15, and wherein the steps further comprise:

determining, responsive to performing the check, status information of the information indicating that the housing is inserted in the holster;

performing, at a later time via the sensor, a second check for the one or more magnetic elements;

determining, responsive to performing the second check, the status information indicating that the housing is not inserted in the holster of the CEW.

17. The CEW of claim 16, further comprising a communications interface, wherein the steps further comprise:

responsive to determining the status information indicating that the housing is not inserted in the holster of the CEW, transmitting, to one or more entities via the communications interface, a notification that the CEW has been removed from the holster of the CEW.

18. The CEW of claim 15, further comprising a memory configured to store information about one or more holsters, wherein determining the information about the holster comprises determining information describing the holster in accordance with the information about the one or more holsters, wherein the information describing the holster comprises a holster type of the holster of the CEW.

19. The CEW of claim 15, wherein the sensor comprises a bipolar sensor, performing the check comprises detecting the respective polarities of the one or more magnetic elements, and determining the information about the holster comprises determining the information in accordance with the one or more respective polarities of the one or more magnetic elements.

20. The CEW of claim 15, wherein the steps further comprise:

detecting, via the sensor, an indicator magnet of the one or more magnetic elements, the indicator magnet having a first position on the holster; and determining, responsive to detecting the indicator magnet, that the housing is inserted in the holster.

* * * * *